US010943139B2

(12) United States Patent
Leizerowich et al.

(10) Patent No.: US 10,943,139 B2
(45) Date of Patent: Mar. 9, 2021

(54) SYSTEM AND METHOD FOR EXTRACTING INFORMATION FROM A RECEIPT

(71) Applicant: Zollo Social Shopping Ltd., Tel Aviv (IL)

(72) Inventors: Alex Leizerowich, Rehovot (IL); Daniel Rejzner, Tel Aviv (IL)

(73) Assignee: Zollo Social Shopping Ltd., Tel Aviv (IL)

( * ) Notice: Subject to any disclaimer, the term of this patent is extended or adjusted under 35 U.S.C. 154(b) by 118 days.

(21) Appl. No.: 16/463,413

(22) PCT Filed: Nov. 1, 2017

(86) PCT No.: PCT/IL2017/051194
§ 371 (c)(1),
(2) Date: May 23, 2019

(87) PCT Pub. No.: WO2018/100570
PCT Pub. Date: Jun. 4, 2018

(65) Prior Publication Data
US 2020/0057903 A1 Feb. 20, 2020

Related U.S. Application Data

(60) Provisional application No. 62/427,831, filed on Nov. 30, 2016.

(51) Int. Cl.
G06K 9/20 (2006.01)
G06Q 40/00 (2012.01)
G06F 16/33 (2019.01)
G06F 40/295 (2020.01)
H04N 5/232 (2006.01)

(52) U.S. Cl.
CPC ......... G06K 9/2054 (2013.01); G06F 16/334 (2019.01); G06F 40/295 (2020.01);
(Continued)

(58) Field of Classification Search
CPC .. G06K 9/2054; G06K 2209/01; G06Q 40/12; G06Q 30/02; G06Q 30/0625;
(Continued)

(56) References Cited

U.S. PATENT DOCUMENTS 7,069,240 B2   6/2006 Spero et al.
7,792,709 B1   9/2010 Trandal et al.
(Continued)

FOREIGN PATENT DOCUMENTS

EP   2988259 A1   2/2016
GB   2495720 A    4/2013
WO   2014009786 A1 1/2014

OTHER PUBLICATIONS

International Search Report for PCT/IL2017/051194 dated Aug. 1, 2018 by European Patent Office.
(Continued)

Primary Examiner — Diane D Mizrahi
(74) Attorney, Agent, or Firm — Webb and Co. Ltd.; Chanoch Kahn

(57) ABSTRACT

A machine implemented method for extracting information from a receipt, the method constituted of: receiving an image of the receipt; identifying a first text portion within the receipt image which represents a product name abbreviation; abbreviating, in accordance with an abbreviation rule, one of the identified first text portion and a plurality of product names stored on a database, each associated with a product identifier; determining a plurality of candidate product identifiers responsive to the abbreviation; for each of a plurality of predetermined features, assigning a value to each of the identified candidate product identifiers; responsive to the assigned values, assigning a candidate score to each of the identified candidate product identifiers; responsive to the assigned candidate scores and a predetermined scoring rule, selecting one candidate product identifier, which is repre-
(Continued)

sented by the identified first text portion; and outputting the selected candidate product identifier.

28 Claims, 9 Drawing Sheets

(52) U.S. Cl.
CPC ......... *G06Q 40/12* (2013.12); *H04N 5/23229* (2013.01); *H04N 5/23293* (2013.01); *G06K 2209/01* (2013.01)

(58) Field of Classification Search
CPC . G06F 16/334; G06F 40/295; H04N 5/23229; H04N 5/23293
See application file for complete search history.

(56) References Cited

U.S. PATENT DOCUMENTS

| | | |
|---|---|---|
| 9,245,296 B2 | 1/2016 | Nuggehalli |
| 2003/0004831 A1 | 1/2003 | Owens |
| 2005/0049928 A1 | 3/2005 | Naick et al. |
| 2007/0136140 A1 | 6/2007 | Smith, Jr. |
| 2010/0306080 A1 | 12/2010 | Trandal et al. |
| 2011/0022463 A1 | 1/2011 | Harris |
| 2011/0052075 A1 | 3/2011 | Comay et al. |
| 2012/0072280 A1* | 3/2012 | Lin .................... G06Q 30/0246 705/14.45 |
| 2012/0284081 A1 | 11/2012 | Cheng et al. |
| 2013/0085908 A1 | 4/2013 | Singh et al. |
| 2013/0201307 A1 | 8/2013 | Schloter et al. |
| 2017/0140432 A1* | 5/2017 | Lin .................... G06Q 30/0246 |

OTHER PUBLICATIONS

Written Opinion of the International Searching Authority for PCT/IL2017/051194 dated Aug. 1, 2018 by European Patent Office.
Mandy Movahhed; "The Best Receipt Tracking Apps"; published on-line Sep. 3, 2014 at www.handshake.com.

* cited by examiner

SYSTEM AND METHOD FOR EXTRACTING INFORMATION FROM A RECEIPT

CROSS-REFERENCE FROM RELATED APPLICATIONS

This application claims priority from U.S. provisional patent application Ser. No. 62/427,831, filed Nov. 30, 2016 and entitled "SYSTEM AND METHOD FOR EXTRACTING INFORMATION FROM A RECEIPT", the entire contents of which are incorporated herein by reference.

FIELD OF THE INVENTION

The invention relates generally to the field of commerce, and in particular to a system and method for extracting information from a receipt.

BACKGROUND OF THE INVENTION

When purchasing items in an outlet, a receipt is issued which generally includes descriptions of the items purchased and their price. Paper receipts can then be transformed to a digital format by scanning or photographing. The digital image can then be stored for later reference and information can be extracted therefrom for a variety of uses. Particularly, optical recognition (OCR) techniques can be used to extract text from the receipt image and natural language processing (NLP) techniques can be used to identify different items and prices within the text.

Typically, these NLP techniques are not sufficient to identify the listed items since outlets generally use abbreviations, misspellings or other codes for items in order to meet spacing requirements on the receipt. In order to overcome these difficulties, U.S. patent application publication S/N US 2012/0284081, filed Nov. 8, 2012 and entitled "METHODS AND APPARATUS FOR GATHERING INTELLIGENCE FROM ITEMIZED RECEIPTS", the entire content of which are incorporated herein by reference, has taught a method for identifying items on receipt images. This is accomplished by comparing the receipt text to one or more databases of items and using matching algorithms to find the best match. Unfortunately, the matching algorithms used by the prior art do not provide accurate enough results in order to be able to consistently extract correct information from the receipt.

SUMMARY

Accordingly, it is a principal object of the present invention to overcome at least some of the disadvantages of the prior art. In one embodiment, this is provided by a machine implemented method for extracting information from a receipt, the method comprising: receiving an image of the receipt; identifying a first text portion within the received receipt image which represents a product name abbreviation; abbreviating, in accordance with at least one abbreviation rule, at least one of the identified first text portion and a plurality of product names stored on a product database, each of the product names associated with one of a plurality of product identifiers; determining a plurality of candidates of the plurality of product identifiers responsive to the abbreviation; for each of a plurality of predetermined features, assigning a value to each of the identified candidate product identifiers; responsive to the assigned values, assigning a candidate score to each of the identified candidate product identifiers; responsive to the assigned candidate scores and a predetermined scoring rule, selecting one of the determined candidate product identifiers, the selected candidate product identifier being represented by the identified first text portion; and outputting the selected candidate product identifier.

In one embodiment, each of the identified first text portion and the plurality of product names are abbreviated in accordance with the at least one abbreviation rule, the method further comprising comparing the abbreviated first text portion to each of the abbreviated product names, wherein the candidate product identifier determination is responsive to the comparison. In another embodiment, the at least one abbreviation rule comprises one of: a removal of sequentially repeating characters; a removal of a vowel; and a porter stemming algorithm.

In one embodiment, the method further comprises tokenizing the identified first text portion into a plurality of tokens, wherein the at least one abbreviation rule comprises a plurality of abbreviation rules, a first of the plurality of tokens is abbreviated in accordance with a first of the plurality of abbreviation rules and a second of the plurality of tokens is abbreviated in accordance with a second of the plurality of abbreviation rules. In another embodiment, the method further comprises: identifying a second text portion within the received receipt image containing information regarding the outlet which issued the receipt; responsive to the identified second text portion, determining the identity of the outlet which issued the receipt; responsive to the determined outlet identity and a predetermined relation rule, identifying at least one additional outlet related to the outlet which issued the receipt, wherein the assigned value for a respective one of the uniform features is responsive to a purchasing history of a product represented by the respective candidate product identifier in the identified related additional outlet.

In one further embodiment, the identifying the at least one additional related outlet comprises identifying a plurality of related outlets within a predetermined distance from the outlet which issued the receipt. In another further embodiment, the assigned value for a respective one of the uniform features is responsive to whether a product represented by the respective candidate product identifier was sold in any of the identified plurality of related outlets during a predetermined time period.

In one further embodiment, the method further comprises: identifying a third text portion within the received receipt image which represents the price of the product represented by the identified first text portion; and responsive to the identified third text portion, determining the price of the product represented by the identified first text portion, wherein the assigned value for a respective one the uniform features is responsive to the number of times a product represented by the respective candidate product identifier was sold in the identified at least one additional related outlet within a predetermined margin of the determined price. In another further embodiment, the method further comprises: identifying a third text portion within the received receipt image which represents the price of the product represented by the identified first text portion; and responsive to the identified third text portion, determining the price of the product represented by the identified first text portion, wherein the identifying at least one additional related outlet comprises identifying a plurality of additional related outlets, wherein the assigned value for a respective one the uniform features is responsive to the distance between the outlet which issued the receipt and the closest of the identified additional related outlets which sold a product represented by the respective candidate product identifier within a predetermined margin of the determined price.

In one embodiment, the method further comprises: identifying a second text portion within the received receipt image containing information regarding the outlet which issued the receipt; responsive to the identified second text portion, determining the identity of the outlet which issued the receipt; identifying a third text portion within the received receipt image which represents the price of the product represented by the identified first text portion; responsive to the identified third text portion, determining the price of the product represented by the identified first text portion; and associating the determined candidate product identifier with the determined product price and the determined outlet identity, wherein the method further comprises outputting the associated product price and outlet identity. In one further embodiment, the method further comprises: comparing the determined product price to historical price of products represented by the selected candidate product in the outlet which issued the receipt; and responsive to an output of the comparison that the determined product price is lower than the historical price, outputting an indication that a product represented by the selected candidate product identifier is on sale at the outlet which issued the receipt.

In another embodiment, the method further comprises: receiving from a user device a pricing information request associated with a product; retrieving from an outlet database pricing information associated with the product of the received pricing information request; and outputting to the user device the retrieved pricing information. In one further embodiment, the retrieving the pricing information comprises retrieving pricing information for the product in each of a plurality of outlets, and wherein the output retrieved pricing information comprises pricing information of the product in each of the plurality of outlets.

In one embodiment, the method further comprises: receiving from a product provider a request for a purchasing history of a user of a product represented by a particular product identifier; comparing the selected product identifier with the particular product identifier of the received request; and responsive to an outcome of the comparison indicating that the selected product identifier matches the particular product identifier of the received request, outputting to the product provider information regarding the selected product identifier. In another embodiment, the method further comprises: receiving from a product provider benefit information for a user associated with the purchase of a product represented by a particular product identifier; comparing the selected product identifier with the particular product identifier of the received benefit information; and responsive to an outcome of the comparison indicating that the selected product identifier matches the particular product identifier of the received benefit information, providing benefits to user in accordance with the received benefit information.

In one embodiment, the method further comprises comparing the identified first text portion to a plurality of known product identifiers, wherein the candidate product identifier determination is further responsive to the outcome of the comparison with known product identifiers. In one further embodiment, responsive to an unsuccessful selection in accordance with the predetermined scoring rule, the method further comprises: transmitting to a user device a signal which prompts a user of the user device to scan a barcode of the unidentified product; receiving barcode information of the unidentified product from the user device; storing the received barcode information; and associating the received barcode information with the identified first text portion.

In one independent embodiment, machine implemented method for extracting information from a receipt is provided, the method comprising: receiving an image of the receipt; identifying a first text portion within the received receipt image which represents a product name; identifying a second text portion within the received receipt image containing information regarding the outlet which issued the receipt; responsive to the identified second text portion, determining the identity of the outlet which issued the receipt; responsive to the determined outlet identity and a predetermined relation rule, identifying at least one additional outlet related to the outlet which issued the receipt; responsive to a predetermined similarity rule, determining a plurality of candidate product identifiers stored on a database which have associated product names that exhibit a predetermined similarity with the identified first text portion; for each of a plurality of predetermined features, assigning a value to each of the identified candidate product identifiers, the assigned value for a respective one of the uniform features is responsive to a purchasing history of a product represented by the respective candidate product identifier in the identified related additional outlet; responsive to the assigned values, assigning a candidate score to each of the identified candidate product identifiers; responsive to the assigned candidate scores and a predetermined scoring rule, selecting one of the determined candidate product identifiers, the selected candidate product identifier being represented by the identified first text portion; and outputting the selected candidate product identifier.

In one embodiment, the identifying the at least one additional related outlet comprises identifying a plurality of related outlets within a predetermined distance from the outlet which issued the receipt. In one further embodiment, the assigned value for a respective one of the uniform features is responsive to whether a product represented by the respective candidate product identifier was sold in any of the identified plurality of related outlets during a predetermined time period.

In one embodiment, the method further comprises: identifying a third text portion within the received receipt image which represents the price of the product represented by the identified first text portion; and responsive to the identified third text portion, determining the price of the product represented by the identified first text portion, wherein the assigned value for a respective one the uniform features is responsive to the number of times a product represented by the respective candidate product identifier was sold in the identified at least one additional related outlet within a predetermined margin of the determined price. In another embodiment, the method further comprises: identifying a third text portion within the received receipt image which represents the price of the product represented by the identified first text portion; and responsive to the identified third text portion, determining the price of the product represented by the identified first text portion, wherein the identifying at least one additional related outlet comprises identifying a plurality of additional related outlets, wherein the assigned value for a respective one the uniform features is responsive to the distance between the outlet which issued the receipt and the closest of the identified additional related outlets which sold a product represented by the respective candidate product identifier within a predetermined margin of the determined price.

In one embodiment, the method further comprises abbreviating, in accordance with at least one abbreviation rule, at least one of the identified first text portion and the plurality of product names, wherein the candidate product identifier determination is responsive to the abbreviation.

In one further embodiment, each of the identified first text portion and the plurality of product names are abbreviated in accordance with the at least one abbreviation rule, the method further comprising comparing the abbreviated first text portion to each of the abbreviated product names, wherein the candidate product identifier determination is responsive to the comparison. In another further embodiment, the at least one abbreviation rule comprises one of: a removal of sequentially repeating characters; a removal of a vowel; and a porter stemming algorithm. In one further embodiment, the method further comprises tokenizing the identified first text portion into a plurality of tokens, wherein the at least one abbreviation rule comprises a plurality of abbreviation rules, a first of the plurality of tokens is abbreviated in accordance with a first of the plurality of abbreviation rules and a second of the plurality of tokens is abbreviate in accordance with a second of the plurality of abbreviation rules.

In one embodiment, the method further comprises: identifying a third text portion within the received receipt image which represents the price of the product represented by the identified first text portion; responsive to the identified third text portion, determining the price of the product represented by the identified first text portion; and associating the selected candidate product with the determined product price and the determined outlet identity, wherein the outputting the determined candidate product further comprises outputting the associated product price and outlet identity. In one further embodiment, the method further comprises: comparing the determined product price to historical price of products represented by the selected candidate product in the outlet which issued the receipt; and responsive to an output of the comparison that the determined product price is lower than the historical price, outputting an indication that a product represented by the selected candidate product identifier is on sale at the outlet which issued the receipt.

In another embodiment, the method further comprises: receiving from a user device a pricing information request associated with a product; retrieving from an outlet database pricing information associated with the product of the received pricing information request; and outputting to the user device the retrieved pricing information. In one further embodiment, the retrieving the pricing information comprises retrieving pricing information for the product in each of a plurality of outlets, and wherein the output retrieved pricing information comprises pricing information of the product in each of the plurality of outlets.

In one embodiment, the method further comprises: receiving from a product provider a request for a purchasing history of a user of a product represented by a particular product identifier; comparing the selected product identifier with the particular product identifier of the received request; and responsive to an outcome of the comparison indicating that the selected product identifier matches the particular product identifier of the received request, outputting to the product provider information regarding the selected product identifier. In another embodiment, the method further comprises: receiving from a product provider benefit information for a user associated with the purchase of a product represented by a particular product identifier; comparing the selected product identifier with the particular product identifier of the received benefit information; and responsive to an outcome of the comparison indicating that the selected product identifier matches the particular product identifier of the received benefit information, providing benefits to user in accordance with the received benefit information.

In one embodiment, the method further comprises comparing the identified first text portion to a plurality of known product identifiers, wherein the candidate product identifier determination is further responsive to the outcome of the comparison with known product identifiers. In one further embodiment, responsive to an unsuccessful selection in accordance with the predetermined scoring rule, the method further comprises: transmitting to a user device a signal which prompts a user of the user device to scan a barcode of the unidentified product; receiving barcode information of the unidentified product from the user device; storing the received barcode information; and associating the received barcode information with the identified first text portion.

In another independent embodiment, a receipt information extraction system is provided, the receipt information extraction system comprising: a processor; and a memory, the having stored thereon computer readable instructions which when read by the processor cause the processor to: receive an image of the receipt; identify a first text portion within the received receipt image which represents a product name abbreviation; abbreviate, in accordance with at least one abbreviation rule, at least one of the identified first text portion and a plurality of product names stored on a product database, each of the product names associated with one of a plurality of product identifiers; determine a plurality of candidates of the plurality of product identifiers responsive to the abbreviation; for each of a plurality of predetermined features, assign a value to each of the identified candidate product identifiers; responsive to the assigned values, assign a candidate score to each of the identified candidate product identifiers; responsive to the assigned candidate scores and a predetermined scoring rule, select one of the determined candidate product identifiers, the selected candidate product identifier being represented by the identified first text portion; and output the selected candidate product identifier.

In one independent embodiment, a receipt information extraction system is provided, the receipt information extraction system comprising: a processor; and a memory, the having stored thereon computer readable instructions which when read by the processor cause the processor to: receive an image of the receipt; identify a first text portion within the received receipt image which represents a product name; identify a second text portion within the received receipt image containing information regarding the outlet which issued the receipt; responsive to the identified second text portion, determine the identity of the outlet which issued the receipt; responsive to the determined outlet identity and a predetermined relation rule, identify at least one additional outlet related to the outlet which issued the receipt; responsive to a predetermined similarity rule, determine a plurality of candidate product identifiers stored on a database which have associated product names that exhibit a predetermined similarity with the identified first text portion; for each of a plurality of predetermined features, assign a value to each of the identified candidate product identifiers, the assigned value for a respective one of the uniform features is responsive to a purchasing history of a product represented by the respective candidate product identifier in the identified related additional outlet; responsive to the assigned values, assign a candidate score to each of the identified candidate product identifiers; responsive to the assigned candidate scores and a predetermined scoring rule, select one of the determined candidate product identifiers, the selected candidate product identifier being represented by the identified first text portion; and output the selected candidate product identifier.

Additional features and advantages of the invention will become apparent from the following drawings and description.

BRIEF DESCRIPTION OF THE DRAWINGS

For a better understanding of various embodiments of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1A:
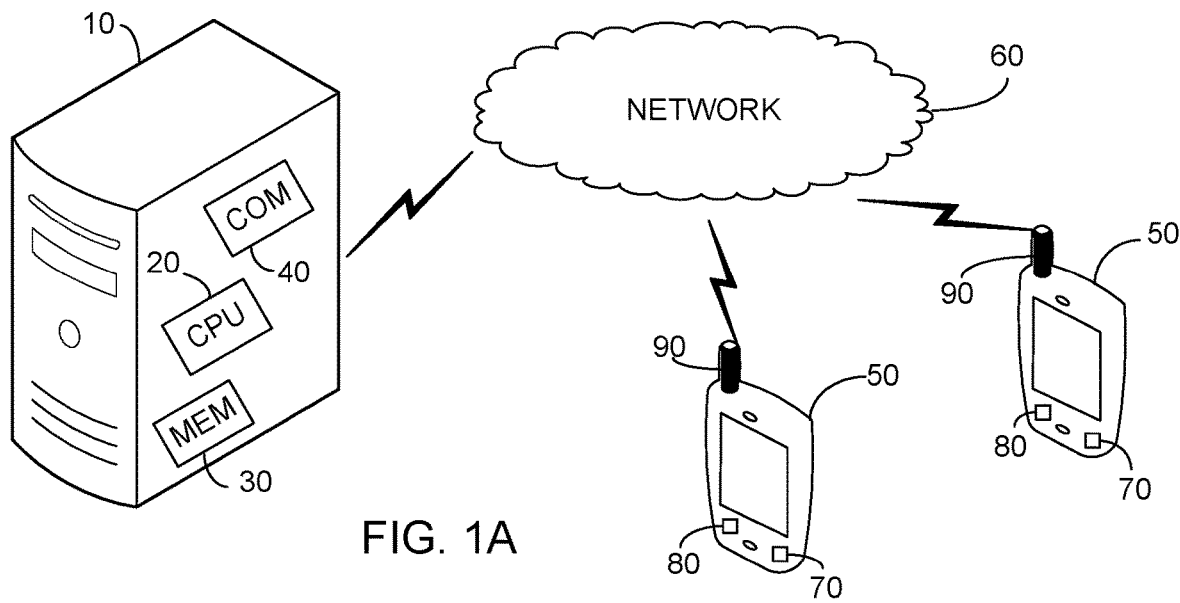
FIGS. 1A-1C illustrate high level block diagrams of a receipt information extraction system, in accordance with certain embodiments.

Before explaining at least one embodiment in detail, it is to be understood that the invention is not limited in its application to the details of construction and the arrangement of the components set forth in the following description or illustrated in the drawings. The invention is applicable to other embodiments being practiced or carried out in various ways. Also, it is to be understood that the phraseology and terminology employed herein is for the purpose of description and should not be regarded as limiting.

FIG. 1A illustrates a high level schematic diagram of a receipt information extraction system 10, according to certain embodiments. Receipt information extraction system 10 comprises: a processor 20; a memory 30; and a communications module 40. In one embodiment, communications module 40 is in communication with a plurality of user devices 50 over a network 60. In one embodiment, the operation of processor 20 is responsive to instructions stored on memory 30. In another embodiment, network 60 is the internet or a cellular network. Each user device 50 comprises: a processor 70; a memory 80; and a communications module 90. In one embodiment, memory 80 has stored thereon instructions which cause processor 70 to operate. In another embodiment, communications module 40 of receipt information extraction system 10 is in communication with communications module 90 of each user device 50 over network 60.

Figure 1B:
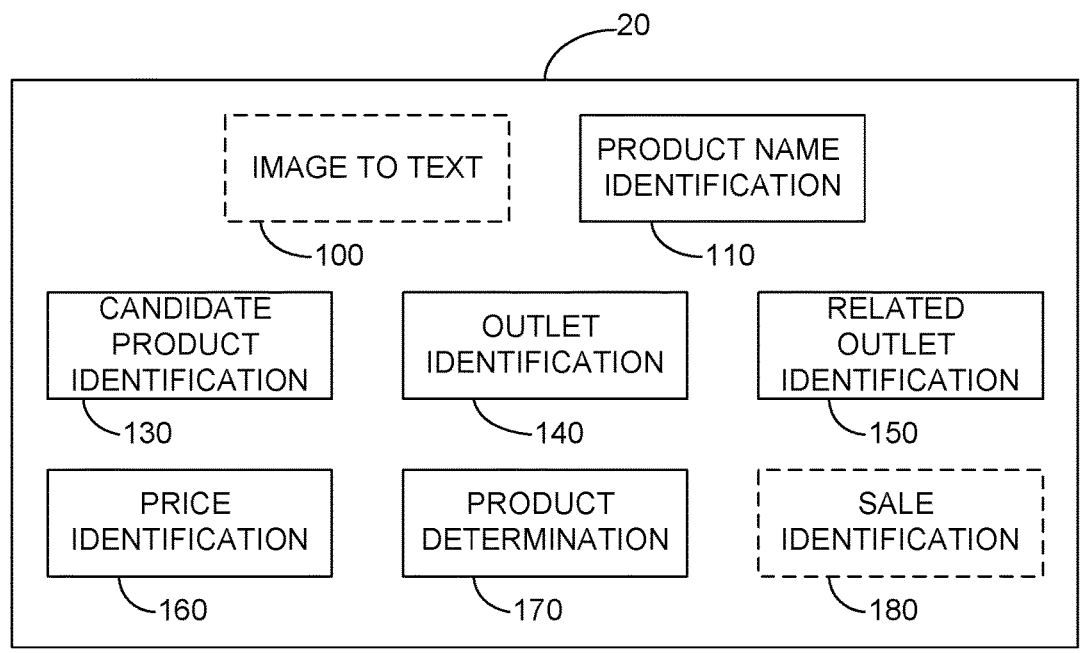

FIG. 1B illustrates a high level block diagram of a detailed embodiment of processor 20 of receipt information extraction system 10. Processor 20 comprises: an optional image to text functionality 100; a product name identification functionality 110; a candidate product identification functionality 130; an outlet identification functionality 140; a related outlet identification functionality 150; a price identification functionality 160; a product determination functionality 170; and an optional sale identification functionality 180. The different embodiments of operation of receipt information extraction system 10 will be described below in relation to stages 1000-1110 of FIG. 2 and stages 2000-2110 of FIG. 3. Optional image to text functionality 100, product name identification functionality 110, candidate product identification functionality 130, outlet identification functionality 140, related outlet identification functionality 150, price identification functionality 160, product determination functionality 170 and optional sale identification functionality 180 are illustrated as separate units, however this is not meant to be limiting in any way. In one embodiment, each of optional image to text functionality 100, product name identification functionality 110, candidate product identification functionality 130, outlet identification functionality 140, related outlet identification functionality 150, price identification functionality 160, product determination functionality 170 and optional sale identification functionality 180 is performed by different lines of code stored on memory 30 and implemented by processor 20.

Figure 1C:
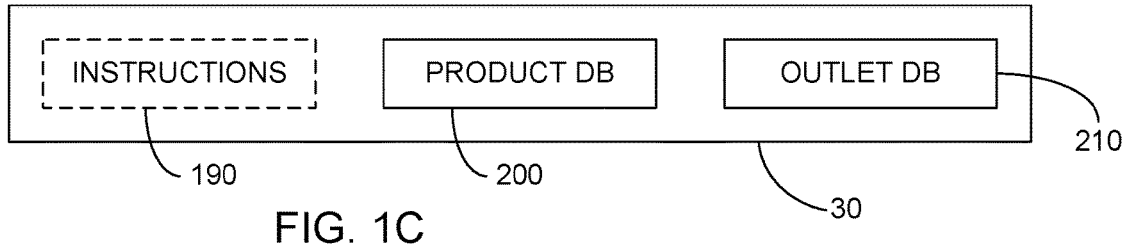

FIG. 1C illustrates a high level block diagram of a detailed embodiment of memory 30. Memory 30 comprises: an optional instruction storage 190 having stored thereon instructions which cause processor 20 to operate; a product database 200 having stored thereon a plurality of product names, an identification code for the product, such as a universal product code (UPC) and/or the brand of the product; and an outlet database 210 having stored thereon information regarding a plurality of outlets. In one embodiment, the outlet information includes: the location of the outlet; the chain which owns the outlet and identification information of other outlets of the chain; and the prices and purchase histories of the different products stored on product database 200 at the respective outlet. In another embodiment, product database 200 has stored thereon, for each product, the name of the product as received from a point of sale (POS) system of one or more retailers. In one embodiment, for at least some of the products, product database 200 further has stored thereon the known product identifier used by specific outlets for each product along with an identifier of each respective outlet. In an embodiment where different known product identifiers of a product exist for a plurality of outlets, product database 200 has stored thereon each known product identifier along with identifiers of the respective outlets.

Figure 2A:
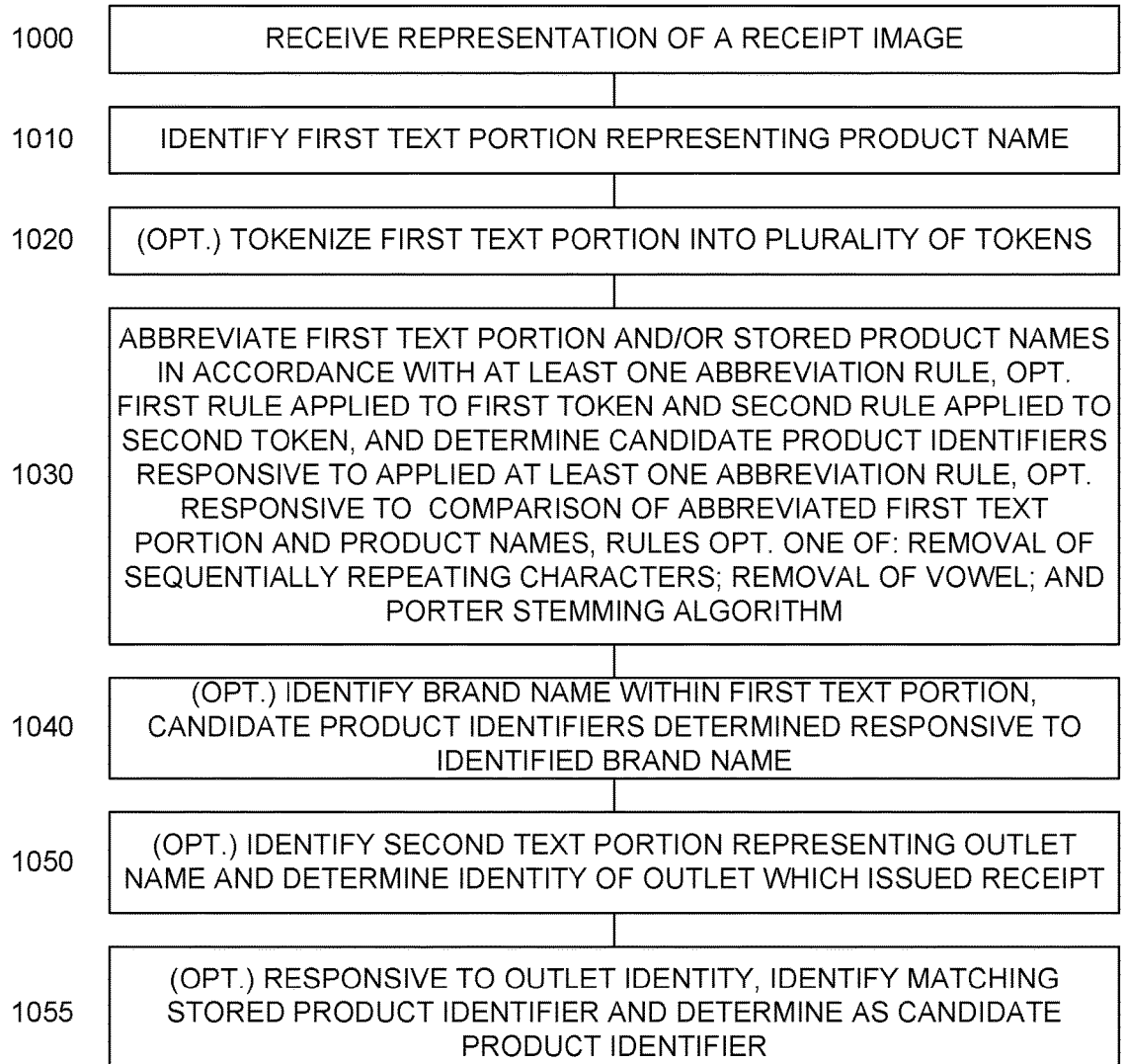
FIGS. 2A-2B illustrate a high level flow chart of a first embodiment of a method of extracting information from a receipt.
Figure 2B:
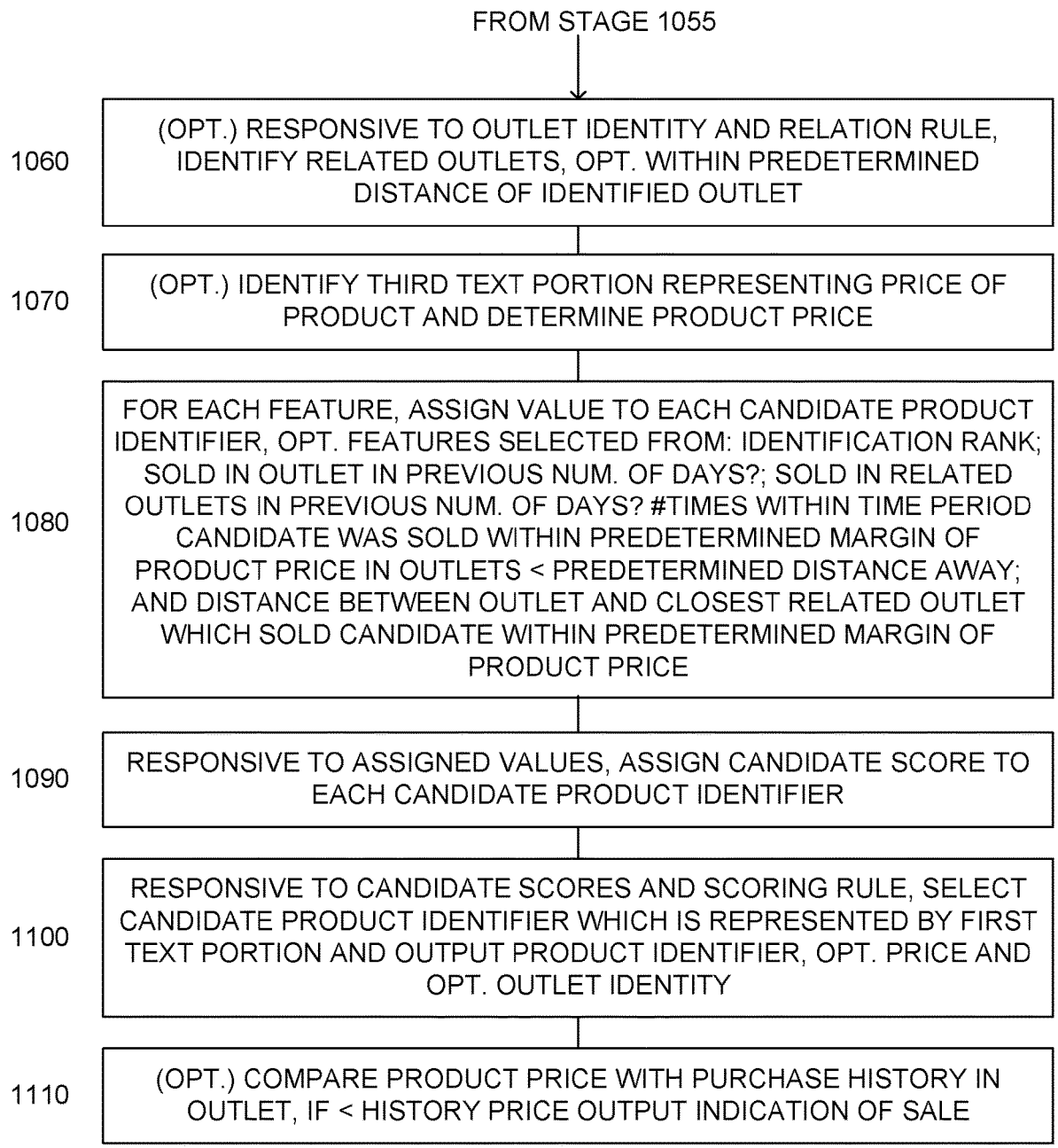

FIGS. 2A-2B illustrate a high level flow chart of a first embodiment of a method for extracting information from a receipt. The method of FIGS. 2A-2B is described in relation to receipt information extraction system 10, however this is not meant to be limiting in any way and the method of FIGS. 2A-2B may be performed by any appropriate system. In stage 1000, communications module 40 is arranged in one embodiment to receive, via network 60, an image of a receipt taken by any of user devices 50. In another embodiment, the image of the receipt is taken at one of user devices 50 and an app on user device 50 is arranged to convert the image into text, optionally by OCR. The text representation of the receipt is then transmitted to communications module 40 of receipt information extraction system 10 via network 60. In the embodiment where communications module 40 is arranged to receive the receipt image which was imaged by one of user devices 50, optional image to text functionality 100 is arranged to convert the received receipt image to a text representation thereof, optionally by OCR.

In stage 1010, product name identification functionality 110 identifies a first text portion of the receipt image of stage 1000, i.e. a first portion of the textual representation of the receipt image, which represents the name of a product. In one embodiment, the portion representing the product name is identified by identifying known field formats in the receipt image. For example, a product name composed mostly of letters is followed by a price composed of numbers, optionally in the form of 'XX.XX'. Thus, when a line on the receipt comprises a section with letters and a section with numbers, product name identification functionality identifies the section with the letters as a product name.

The term 'product', as used herein, is not meant to be limited to a physical object, and is particularly meant to include any items and services being sold or provided by the outlet which issued the receipt. Additionally, the term 'outlet', as used herein, is not meant to be limited to a store selling physical items, and is particularly meant to include any entity which provides products. In one non-limiting embodiment, this includes stores, stalls, restaurants, hotels and entertainment providers.

In optional stage 1020, candidate product identification functionality 130 tokenizes the identified first text portion of stage 1010 into a plurality of tokens. The term 'token' as used herein is meant to include any predetermined text block type, such as a single word.

In stage 1030, responsive to at least one abbreviation rule, candidate product identification functionality 130 compares the identified first text portion of stage 1010 to the product names stored on product database 200. Particularly, as described above, the product names written on the receipt are usually abbreviated in accordance with an unknown rule. Additionally, in the embodiment where the product names stored on product database 200 are received from retailer POS systems, the product names stored on product database 200 are typically abbreviated. However, the abbreviation of the product name on the receipt is not necessarily the same as the abbreviation of the product name received from the POS system, which may abbreviate in accordance with a different unknown rule. Candidate product identification functionality 130 applies the at least one abbreviation rule to the identified first text portion of stage 1010 and/or to each of a plurality of the product names stored on product database 200 in order to find a product name on product database 200 which matches the name of the product which is represented by the identified first text portion on the receipt.

Specifically, candidate product identification functionality 130 further abbreviates the product names on product database 200 and/or the identified first text portion in accordance with the at least one abbreviation rule. Candidate product identification functionality 130 then compares the identified first text portion, optionally further abbreviated with the at least one abbreviation rule, to the product names on product database 200, which are optionally abbreviated with the at least one abbreviation rule, to find a match. An identifier associated with any product name on product database 200, after any optional abbreviation by candidate product identification functionality 130, which matches the optionally abbreviated first identified text portion, is determined, by candidate product identification functionality 130, to be a candidate product identifier. It is to be understood that multiple identifiers may be found. In one embodiment, the at least one abbreviation rule includes, but is not limited to: all sequentially repeating characters being replaced with a single occurrence of the character, e.g. 'APPLE' is abbreviated to 'APLE'; all vowels are removed unless the vowel is the first character, e.g. 'APPLE' is abbreviated to 'APPL'; and the Porter stemming algorithm, e.g. 'APPLES' is abbreviated to 'APPL'.

For example, in the case where the identified first text portion is 'APLE JUC' and a product name stored on product database 200 is 'APL JUIC', after applying the abbreviation rule of removing all non-first letter vowels to the identified first text portion is abbreviated to 'APL JC' and the stored product name is abbreviated to 'APL JC'. Candidate product identification functionality 130 then compares the abbreviated first text portion, i.e. 'APL JC', to the abbreviated stored product name, i.e. 'APL JC', and responsive to detection that they are the same, identifies the product identifier associated with product name 'APL JUIC' as a candidate product which may represent the actual product, i.e. apple juice, which was sold and is represented by the identified first text portion of the receipt. It is noted that the name 'APPLE JUICE' can represent a variety of apple juice products, with different types, brands, shapes, sizes and other differentiating aspects. Therefore, candidate product identification functionality 130 searches product database 200 for a plurality of candidate product identifiers whose name abbreviation matches the abbreviation of the identified first text portion.

In one embodiment, a plurality of product names are stored on product database 200 for each product identifier, the different product names received from POS systems of different retailers. For example, an apple juice product can be represented by the product name 'APPLE JUICE' which is received from the POS system of a first retailer, 'APL JUIC' which is received from the POS system of a second retailer, 'APPL J' which is received from the POS system of a third retailer and 'AJ' which is received from the POS system of a fourth retailer. In such an embodiment, candidate product identification functionality 130 applies the one or more abbreviation rules to each of the different product names. In the above example, candidate product identification functionality 130 abbreviates the first text portion and the different product names, utilizing the example abbreviation rule, by removing all non-first letter vowels and replacing sequentially repeating characters with a single occurrence of the character. In such a case, 'APPLE JUICE', 'APL JUIC', APPL J' and 'AJ' are abbreviated to 'APL JC', 'APL JC', 'APL J' and 'AJ', respectively. As described above, the first text portion is abbreviated to 'APL JC', which is now represented by two instances in product database 200 after applying the abbreviation rule.

In one embodiment, candidate product identification functionality 130 applies the at least one abbreviation rule to the product names stored on product database 200 in advance.

Therefore, when receiving a receipt image, only the identified first text portion is abbreviated by candidate product identification functionality 130 and the abbreviation is then compared to the pre-abbreviated product names stored on product database 200.

As described above in relation to optional stage 1020, in one embodiment candidate product identification functionality 130 tokenizes the identified first text portion into a plurality of tokens. Additionally, in such an embodiment, candidate product identification functionality 130 further tokenizes the product names stored on product database 200. In one embodiment, candidate product identification functionality 130 abbreviates each of the tokens separately, each in accordance with a respective one of the abbreviation rules, i.e. a first abbreviation rule is applied to a first token and a second abbreviation rule is applied to a second token. For example, the abbreviation 'APPL JUC' is split into two tokens—'APPL' and 'JUC'. Candidate product identification functionality 130 abbreviates the first token, in accordance with the first abbreviation rule, by removing one of the sequentially repeating 'P's and abbreviates the second token, in accordance with the second abbreviation rule, by removing the non-first letter vowel 'U'. Thus, 'APPLE JUC' is abbreviated to 'APL' and 'JC'. The abbreviated tokens are then compared with abbreviated tokens of the product names stored on product database 200 to find matches. It is noted that the terms 'first abbreviation rule', 'second abbreviation rule', 'first token' and 'second token', as used herein, are not meant to be limiting to any specific order and each abbreviation rule can be used for any of the tokens.

In optional stage 1040, the product description in the first text portion represents the product name, the brand name and/or the product category, and candidate product identification functionality 130 further abbreviates the brand name and/or the product category and compares them with brand names and product categories stored on product database 200 to further identify candidate products responsive to brand names and/or product categories, as described above in relation to product names. In another embodiment, there may be no product names on the receipt. Rather, only brand names and/or product categories are written on the receipt and these are compared, optionally after being abbreviated, to brand names and product categories stored on product database 200 to identify candidate product identifiers.

In one embodiment, as described above, candidate product identification functionality 130 abbreviates a brand name of the product and compares the abbreviations with brand names stored on product database 200. In some cases, retailers add the brand name of the product on the receipt, generally in the first 3 tokens of the description. Following the identification of the brand name, candidate product identification functionality 130 only needs to search within product database 200 for products which are sold by that brand name. This allows for a quicker and more accurate identification of product candidates.

In optional stage 1050, outlet identification functionality 140 identifies a second text portion with the received receipt image of stage 1000 containing information regarding the outlet which issued the receipt and determine the identity of the outlet which issued the receipt responsive to the identified second text portion. Optionally, the identity of the outlet is determined based on one or more of the outlet's name, address, telephone number and zip code. In one embodiment, the second text portion is identified by identifying a portion of text which does not match the known product and price field formats described above in relation to stage 1010. In another embodiment, information regarding the identity of the outlet is input by a user at user device 50 and received at communications module 40.

In optional stage 1055, responsive to the determined outlet identity of optional stage 1050, candidate product identification functionality 130 compares the identified first text portion of stage 1010 to a plurality of known product identifiers of the identified outlet stored on product database 200, as described above. In the event that one or more of the known product identifiers matches the identified first text portion, candidate product identification functionality 130 determines the matching product identifier, or identifiers, as candidate product identifiers. It is noted that even if a known product identifier matches the identified first text portion it still may not be the same product because a plurality of products can be identified by the same product identifier on the receipt to the abbreviation. In one embodiment, the known product identifiers are further filtered in accordance with an identified brand and/or product category, as described above. In another embodiment, the comparison to known product identifiers is performed without reference to the identified outlet, rather as a global list of known product identifiers.

In optional stage 1060, responsive to the determined outlet identity of optional stage 1050 and further responsive to a predetermined relation rule, related outlet identification functionality 150 is arranged to identify at least one additional outlet related to the outlet which issued the receipt. The term 'related' as used herein is meant as outlets which belong to the same retailer, i.e. they are outlets of the same chain. In one embodiment, the predetermined relation rule defines the exact relation type which is being sought as sometimes the relationship between outlets can be unclear. For example, there may be outlets which are part of the same chain, but owned by different entities. In such a case, the predetermined relation rule decides which relation type to look for, based on unique parameters, such as the particular product category and location. In one embodiment, only related outlets within a predetermined distance of the identified outlet of optional stage 1050 are identified.

In optional stage 1070, price identification functionality 160 identifies a third text portion within the received receipt image representation of stage 1000 which represents the price of the product represented by the identified first text portion of stage 1010. Responsive to the identified third text portion, price identification functionality 160 determines the price of the product represented by the identified first text portion.

In stage 1080, for each of a plurality of predetermined features, product determination functionality 160 assigns a value to each of the identified candidate product identifiers of stage 1030 such that the relevancy of the different identified candidate product identifiers can be compared, it being understood that a value of zero, or not relevant, is also considered an assignment of a value. The features are in one embodiment responsive to one or more of: the product purchase histories stored on outlet database 210; the determined outlet identity of optional stage 1050, also termed herein the 'issuing outlet'; the identified related outlets of stage 1060; and the determined price of optional stage 1070.

In one non-limiting embodiment, the features are selected from the following group of features:
a) the rank of the determination of the candidate product identifier in stage 1030, i.e. the level of confidence that the match of the first text portion abbreviation and the product name abbreviation is indicative of similar product names, as explained further below;

b) whether or not a product associated with the identified candidate product identifier was sold in the issuing outlet in a first predetermined previous number of days;

c) whether or not a product associated with the identified candidate product identifier was sold in the identified related outlets of stage 1060 in a second predetermined previous number of days, optionally the same as the first predetermined previous number of days;

d) the number of times within a predetermined time period that a product associated with the identified candidate product identifier was sold within a first predetermined margin of the determined product price in the identified related outlets which are less than a predetermined distance away from the issuing outlet, the numbers optionally distributed into clusters to determine a mean; and e) the distance between the issuing outlet and the closest related outlet which sold a product associated with the identified candidate product identifier within a second predetermined margin of the determined product price.

For ranking the candidate product identification of stage 1030, candidate product identification functionality 130 determines the number of times the abbreviation of the first text portion appears in the list of abbreviations of the product names of the identified candidate product identifier. In the above described example in stage 1030, the product names received from the POS systems of the different retailers are 'APPLE JUICE', 'APL JUIC', APPL J' and 'AJ'. As described above, these are abbreviated to 'APL JC', 'APL JC', 'APL J' and 'AJ', and the first text portion is abbreviated to 'APL JC'. Thus, candidate product identification functionality 130 determines that 'APL JC' is present in two out of four product names representing the candidate product identifier, i.e. 50%. Additionally, the first abbreviated token, i.e. 'APL', is present in three out of four product names representing the candidate product, i.e. 75%. A higher percentage means that there is a higher probability that these product names do in fact represent the same name as is represented in the first text portion of the receipt. In one embodiment, the ranking is performed based on term frequency/inverse document frequency (TF/IDF) algorithm.

In stage 1090, responsive to the assigned values of stage 1080, product determination functionality 170 assigns a candidate score to each of the determined candidate product identifiers of stage 1030. In one embodiment, a machine learning model assigns the candidate score based on the importance and relevance of each feature of stage 1080.

In stage 1100, responsive to the assigned candidate scores of stage 1090 and a predetermined scoring rule, product determination functionality 170 selects form the plurality of candidate product identifiers the candidate product identifier which is represented by the description in the identified first text portion of stage 1010. Specifically, the product identifier is a unique identifier which identifies the product's name, brand, size, shape, and other relevant qualities. Therefore, the selected product identifier uniquely identifies the product which is represented by the description in the identified first text portion. In one embodiment, the predetermined scoring rule is such that the candidate product identifier with the highest candidate score is determined to be the correct candidate product identifier. Product determination functionality 170 outputs: the determined candidate product identifier, which as described above is optionally a UPC; and optionally the determined price of the product represented by the determined candidate product identifier within the issuing outlet, as determined in optional stage 1070. In the embodiment where the identity of the issuing outlet is determined in optional stage 1050, product determination functionality 170 optionally further outputs information regarding the issuing outlet identity.

In optional stage 1110, optional sale identification functionality 180 compares the determined product price of optional stage 1070 with a purchase history of the determined candidate product identifier of stage 1100 in the determined issuing outlet of stage 1050, the purchase history stored on outlet database 210. In the event that the determined product price is less than the average historical price, optional sale identification functionality 180 outputs an indication that the product represented by the determined product identifier is on sale at the issuing outlet.

In optional stage 1120, the output information of stages 1100 and 1110 is stored on outlet database 210 such that each product being sold by a specific outlet, uniquely associated with a particular identifier, has associated therewith the actual prices at which the products are being sold. Stages 1010-1120 are repeated for each of the products listed on the receipt image of stage 1000 such that the prices of all of the products listed on the receipt are stored in outlet database 210. Thus, when a user at a user device 50 desires to purchase one or more products, a list can be provided of the cheapest outlets to purchase the products, as will be described below in relation to FIG. 4.

Figure 3A:
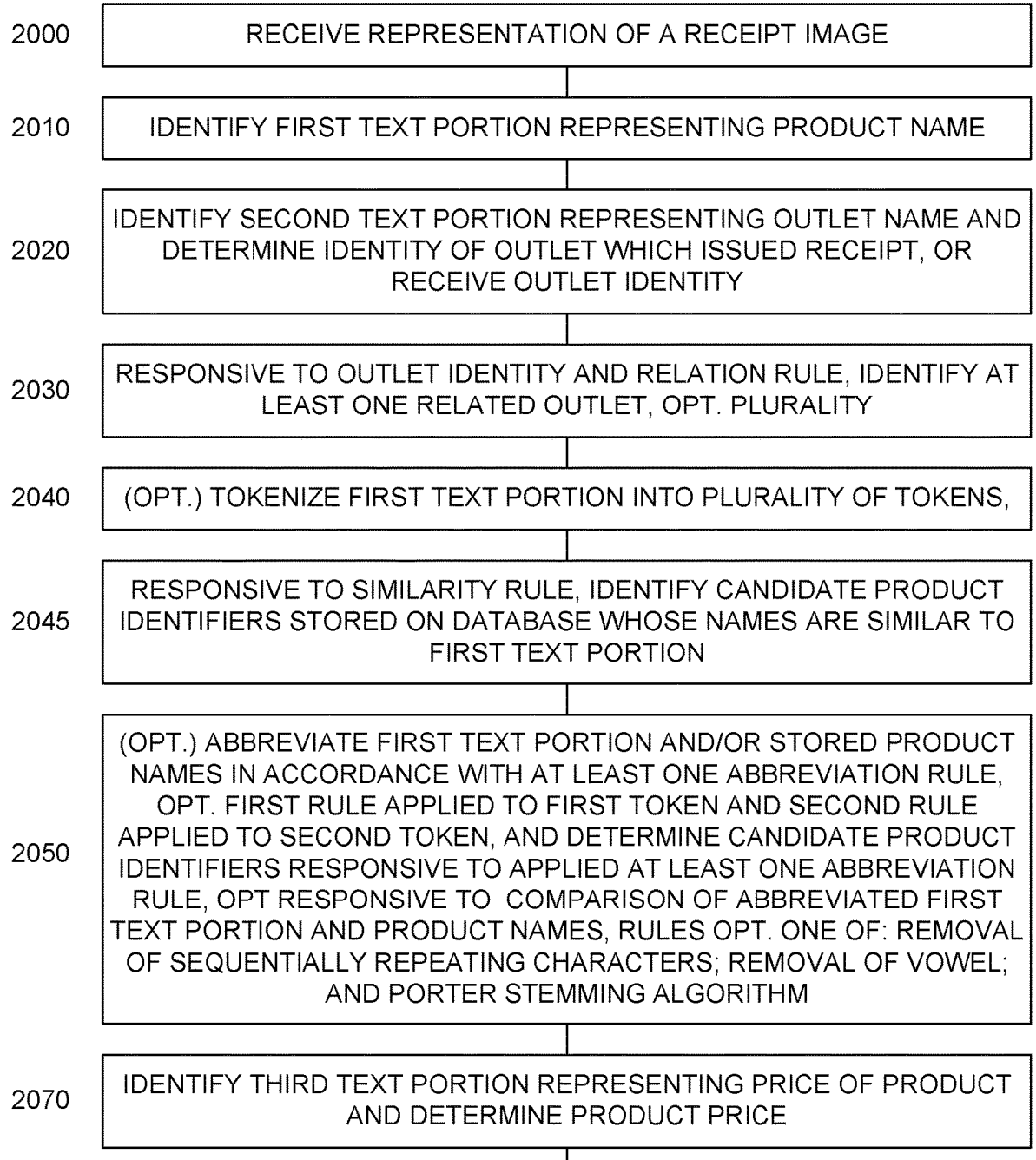
FIGS. 3A-3B illustrate a high level flow chart of a second embodiment of a method of extracting information from a receipt.
Figure 3B:
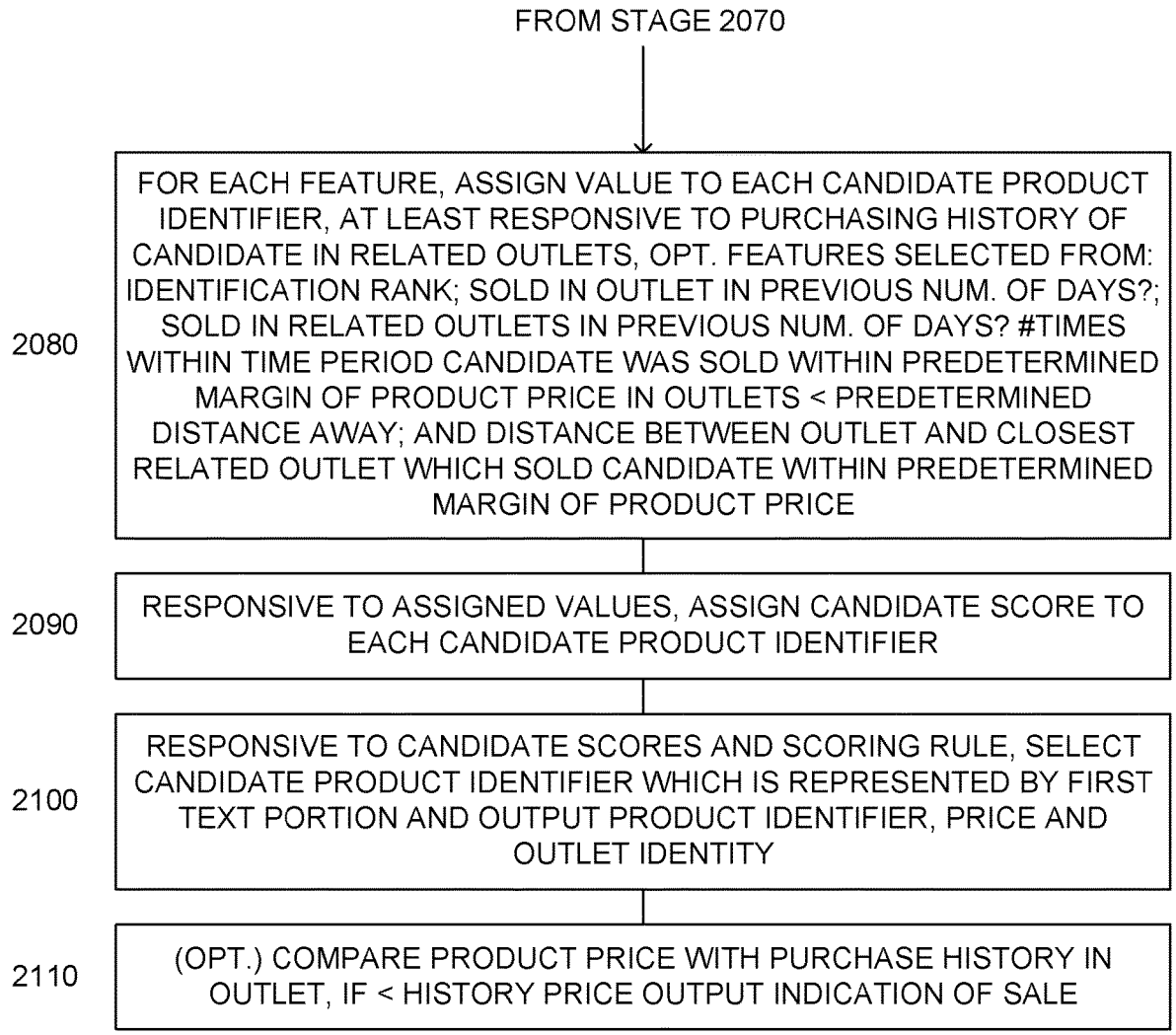

FIGS. 3A-3B illustrate a high level flow chart of a second embodiment of a method for extracting information from a receipt. The method of FIGS. 3A-3B is described in relation to receipt information extraction system 10, however this is not meant to be limiting in any way and the method of FIGS. 3A-3B may be performed by any appropriate system. In stage 2000, in one embodiment communications module 40 receives, via network 60, an image of a receipt taken by any of user devices 50. In another embodiment, the image of the receipt is taken at one of user devices 50 and an app on user device 50 is arranged to convert the image into text, optionally by OCR. The text representation of the receipt is then transmitted to communications module 40 of receipt information extraction system 10 via network 60. In the embodiment where communications module 40 is arranged to receive the receipt image which was imaged by one of user devices 50, optional image to text functionality 100 is arranged to convert the received receipt image to a text representation thereof, optionally by OCR.

In stage 2010, product name identification functionality 110 identifies a first text portion of the receipt image of stage 2000, i.e. a first portion of the textual representation of the receipt image, which represents the name of a product. In one embodiment, the portion representing the product name is identified by identifying known field formats in the receipt image, as described above in relation to stage 1010.

In stage 2020, outlet identification functionality 140 in one embodiment identifies a second text portion within the receipt image representation of stage 2000 containing information regarding the outlet which issued the receipt and determine the identity of the outlet which issued the receipt responsive to the identified second text portion. Optionally, the identity of the outlet is determined based on one or more of the outlet's name, address, telephone number and zip code. In one embodiment, the second text portion is identified by identifying a portion of text which does not match the known product and price field formats described above in relation to stage 1010. In another embodiment, information regarding the identity of the outlet is input by a user at user device 50 and received at communications module 40.

In stage 2030, responsive to the determined outlet identity of stage 2020 and further responsive to a predetermined relation rule, related outlet identification functionality 150 is arranged to identify at least one additional outlet related to the outlet which issued the receipt, preferably a plurality of related outlets. In one embodiment, the predetermined relation rule defines the exact relation type which is being sought as sometimes the relationship between outlets can be unclear, as described above in relation to optional stage 1060. In one embodiment, only related outlets within a predetermined distance of the identified outlet of stage 2020 are identified.

In optional stage 2040, candidate product identification functionality 130 tokenizes the identified first text portion of stage 2010 into a plurality of tokens, as described above in relation to optional stage 1020.

In stage 2045, responsive to a predetermined similarity rule, candidate product identification functionality 130 determines a plurality of candidate product identifiers stored on product database 200 whose product names exhibit a predetermined similarity with the text in the identified first text portion of stage 2010. In one embodiment, candidate product identification functionality 130 compares the text of the first text portion with the text of the product names stored on product database 200 and the similarity rule determines the level of similarity to decide whether to select the candidate product or not. Particularly, as described above the text representing the product name is generally abbreviated. Thus, the letters of the first text portion are compared to the letters of the candidate product names to identify which names are most similar. As described below, in one embodiment the candidate products are identified by comparing abbreviations of the identified first text portion and the product names stored on database 200.

In optional stage 2050, responsive to at least one abbreviation rule, candidate product identification functionality 130 compares the identified first text portion of stage 2010 to the product names stored on product database 200. As described above in relation to stage 1030, candidate product identification functionality 130 applies the at least one abbreviation rule to the identified first text portion and/or to each of a plurality of the product names stored on product database 200, and further compare the abbreviated product names in order to identify the plurality of candidate product identifiers whose abbreviated product names match the abbreviated first text portion. Thus, the candidate product identifier determination of optional stage 2045 is performed responsive to the abbreviation comparisons of optional stage 2050. As described above in relation to stage 1030, in one embodiment the product names stored on product database 200 are abbreviated in advance. As further described above in relation to stage 1030, in one embodiment each of the tokens of optional stage 2040 is abbreviated responsive to a respective one of a plurality of abbreviation rules.

As described above in relation to stage 1040, in one embodiment, the product description in the first text portion includes the product name, the brand name and/or the product category, and candidate product identification functionality 130 further abbreviates the brand name and/or the product category and compares them with brand names and product categories stored on product database 200 in order to identify candidate product identifiers. As described above, this can be done in addition to, or in place of, the abbreviations and comparisons of product names. As further described above, in one embodiment, candidate product identification functionality 130 abbreviates a brand name of the product and compares the abbreviations with brand names stored on product database 200. Following the identification of the brand name, candidate product identification functionality 130 only needs to search within product database 200 for products which are sold by that brand name.

In optional stage 2070, price identification functionality 160 identifies a third text portion within the received receipt image representation of stage 2000 which represents the price of the product represented by the identified first text portion of stage 2010. Responsive to the identified third text portion, price identification functionality 160 determines the price of the product represented by the identified first text portion.

In stage 2080, for each of a plurality of predetermined features, product determination functionality 160 assigns a value to each of the determined candidate product identifiers of stages 2045-2050 such that the relevancy of the different identified candidate product identifiers can be compared, it being understood that a value of zero, or not relevant, is also considered an assignment of a value. The features are responsive to at least the purchasing history of each product represented by a respective one of the identified candidate products in the identified related outlets of stage 2030. Optionally, the features are responsive to one or more of: the product purchase histories stored on outlet database 210; the determined identity of the issuing outlet of optional stage 2020; the identified related outlets of stage 2030; and the determined price of optional stage 2070.

In one non-limiting embodiment, the features are selected from the following group of features:
a) the rank of the determination of the candidate product identifier in stage 2045, i.e. the level of confidence that the match of the first text portion abbreviation and the product name abbreviation is indicative of similar product names, as described above in relation to stage 1080;
b) whether or not a product associated with the identified candidate product identifier was sold in the issuing outlet in a first predetermined previous number of days;
c) whether or not a product associated with the identified candidate product identifier was sold in the identified related outlets of stage 2030 in a second predetermined previous number of days, optionally the same as the first predetermined previous number of days;
d) the number of times within a predetermined time period that a product associated with the identified candidate product identifier was sold within a first predetermined margin of the determined product price in the identified related outlets which are less than a predetermined distance away from the issuing outlet, the numbers optionally distributed into clusters to determine a mean; and
e) the distance between the issuing outlet and the closest related outlet which sold a product associated with the identified candidate product identifier within a second predetermined margin of the determined product price.

In stage 2090, responsive to the assigned values of stage 2080, product determination functionality 170 assigns a candidate score to each of the identified candidate product identifiers of stages 2045-2050. In one embodiment, a machine learning model assigns the candidate score based on the importance and relevance of each feature of stage 2080.

In stage 2100, responsive to the assigned candidate scores of stage 2090 and a predetermined scoring rule, product determination functionality 170 selects one of the plurality of candidate product identifiers which is represented by the description in the identified first text portion of stage 2010. Specifically, as described above, the product identifier is a unique identifier which identifies the product's name, brand, size, shape, and other relevant qualities. Therefore, the selected product identifier uniquely identifies the product which is represented by the description in the identified first text portion. In one embodiment, the predetermined scoring rule is such that the candidate product identifier with the highest candidate score is determined to be the correct candidate product identifier. Product determination functionality 170 outputs: the determined candidate product identifier, which as described above is optionally a UPC; and the determined price of the product represented by the determined candidate product identifier within the issuing outlet, as determined in stage 2070. In the embodiment where the identity of the issuing outlet is determined in stage 2020, product determination functionality 170 further outputs information regarding the issuing outlet identity.

In optional stage 2110, optional sale identification functionality 180 compares the determined product price of stage 2070 with a purchase history of the determined candidate product identifier of stage 2100 in the determined issuing outlet of stage 2020, the purchase history stored on outlet database 210. In the event that the determined product price is less than the average historical price, optional sale identification functionality 180 outputs an indication that the product represented by the determined product identifier is on sale at the issuing outlet.

In optional stage 2120, the output information of stages 2100 and 2110 is stored on outlet database 210 such that each product being sold by a specific outlet, uniquely associated with a particular identifier, has associated therewith the actual prices at which the products are being sold. Stages 2010-2120 are repeated for each of the products listed on the receipt image of stage 2000 such that the prices of all of the products listed on the receipt are stored in outlet database 210. Thus, when a user at a user device 50 desires to purchase one or more products, a list can be provided of the cheapest outlets to purchase the products, as will be described below in relation to FIG. 4.

Figure 6:
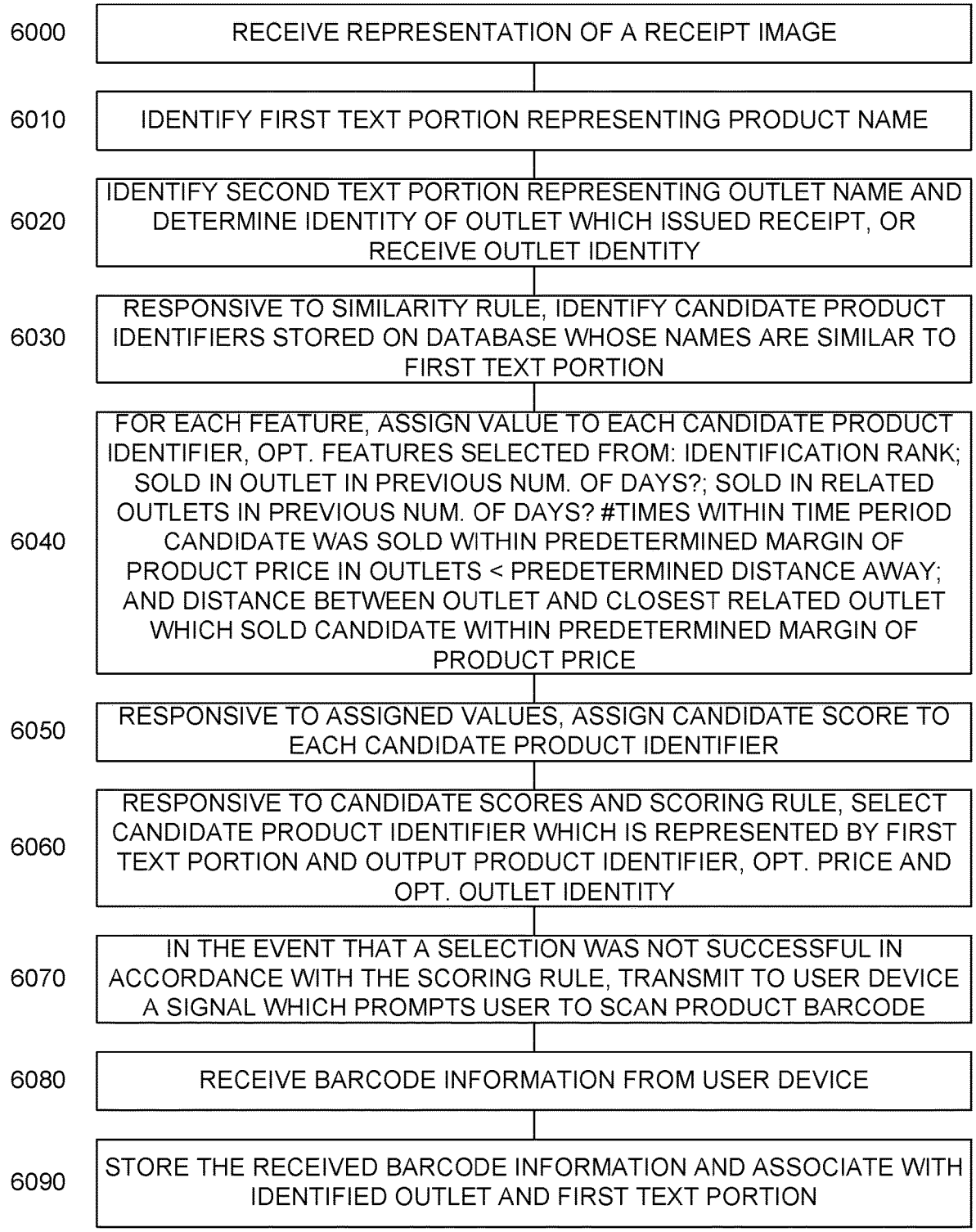
FIG. 6 illustrates a high level flow chart of a method of receiving barcode information of a product described on a receipt.

FIG. 6 illustrates a high level flow chart of a method of receiving barcode information of a product described on a receipt. The method of FIG. 6 is described in relation to receipt information extraction system 10, however this is not meant to be limiting in any way and the method of FIG. 6 may be performed by any appropriate system. In stage 6000, as described above in relation to stage 2000, in one embodiment communications module 40 receives, via network 60, an image of a receipt taken by any of user devices 50. In another embodiment, the image of the receipt is taken at one of user devices 50 and an app on user device 50 is arranged to convert the image into text, optionally by OCR. The text representation of the receipt is then transmitted to communications module 40 of receipt information extraction system 10 via network 60. In the embodiment where communications module 40 is arranged to receive the receipt image which was imaged by one of user devices 50, optional image to text functionality 100 is arranged to convert the received receipt image to a text representation thereof, optionally by OCR.

In stage 6010, as described above in relation to stage 2010, product name identification functionality 110 identifies a first text portion of the receipt image of stage 2000, i.e. a first portion of the textual representation of the receipt image, which represents the name of a product. In one embodiment, the portion representing the product name is identified by identifying known field formats in the receipt image, as described above in relation to stage 1010.

In stage 6020, as described above in relation to stage 2020, outlet identification functionality 140 in one embodiment identifies a second text portion within the receipt image representation of stage 2000 containing information regarding the outlet which issued the receipt and determine the identity of the outlet which issued the receipt responsive to the identified second text portion. Optionally, the identity of the outlet is determined based on one or more of the outlet's name, address, telephone number and zip code. In one embodiment, the second text portion is identified by identifying a portion of text which does not match the known product and price field formats described above in relation to stage 1010. In another embodiment, information regarding the identity of the outlet is input by a user at user device 50 and received at communications module 40.

In stage 6030, as described above in relation to stage 2045, responsive to a predetermined similarity rule, candidate product identification functionality 130 determines a plurality of candidate product identifiers stored on product database 200 whose product names exhibit a predetermined similarity with the text in the identified first text portion of stage 2010. In one embodiment, candidate product identification functionality 130 compares the text of the first text portion with the text of the product names stored on product database 200 and the similarity rule determines the level of similarity to decide whether to select the candidate product or not. Particularly, as described above the text representing the product name is generally abbreviated. Thus, the letters of the first text portion are compared to the letters of the candidate product names to identify which names are most similar. As described below, in one embodiment the candidate products are identified by comparing abbreviations of the identified first text portion and the product names stored on database 200.

In stage 6040, as described above in relation to stage 1080, for each of a plurality of predetermined features, product determination functionality 160 assigns a value to each of the identified candidate product identifiers of stage 6030 such that the relevancy of the different identified candidate product identifiers can be compared, it being understood that a value of zero, or not relevant, is also considered an assignment of a value. The features are in one embodiment responsive to one or more of: the product purchase histories stored on outlet database 210; the determined outlet identity of stage 6020, also termed herein the 'issuing outlet'; any identified related outlets; and a determined price of the product, as all described above.

In stage 6050, as described above in relation to stage 1090, responsive to the assigned values of stage 6040, product determination functionality 170 assigns a candidate score to each of the determined candidate product identifiers of stage 2030. In one embodiment, a machine learning model assigns the candidate score based on the importance and relevance of each feature of stage 6040.

In stage 6060, as described above in relation to stage 1100, responsive to the assigned candidate scores of stage 6050 and a predetermined scoring rule, product determination functionality 170 selects form the plurality of candidate product identifiers the candidate product identifier which is represented by the description in the identified first text portion of stage 6010. Specifically, the product identifier is a unique identifier which identifies the product's name, brand, size, shape, and other relevant qualities. Therefore, the selected product identifier uniquely identifies the product which is represented by the description in the identified first text portion. In one embodiment, the predetermined scoring rule is such that the candidate product identifier with the highest candidate score is determined to be the correct candidate product identifier. Product determination functionality 170 outputs: the determined candidate product identifier, which as described above is optionally a UPC; and optionally a determined price of the product represented by the determined candidate product identifier within the issuing outlet, as described above in relation to optional stage 1070. In one embodiment, product determination functionality 170 optionally further outputs information regarding the issuing outlet identity determined in stage 6020.

In stage 6070, in the event that in stage 6060 a selection in accordance with the predetermined scoring rule was not successful, for example is several candidate product identifiers received the same score, processor 20 generates a user prompt signal. The user prompt signal is transmitted by communications device 40 to user device 50. The received user prompt signal instructs processor 70 of user device 50 to prompt the user to scan the barcode of the unidentified product. Particularly, in one embodiment, processor 70 outputs on a display of user device 50 the image of the identified first text portion of stage 6010. The user the proceeds to scan the barcode of the device and processor 70 transmits the scanned information to receipt information extraction system 10.

Figure 4:
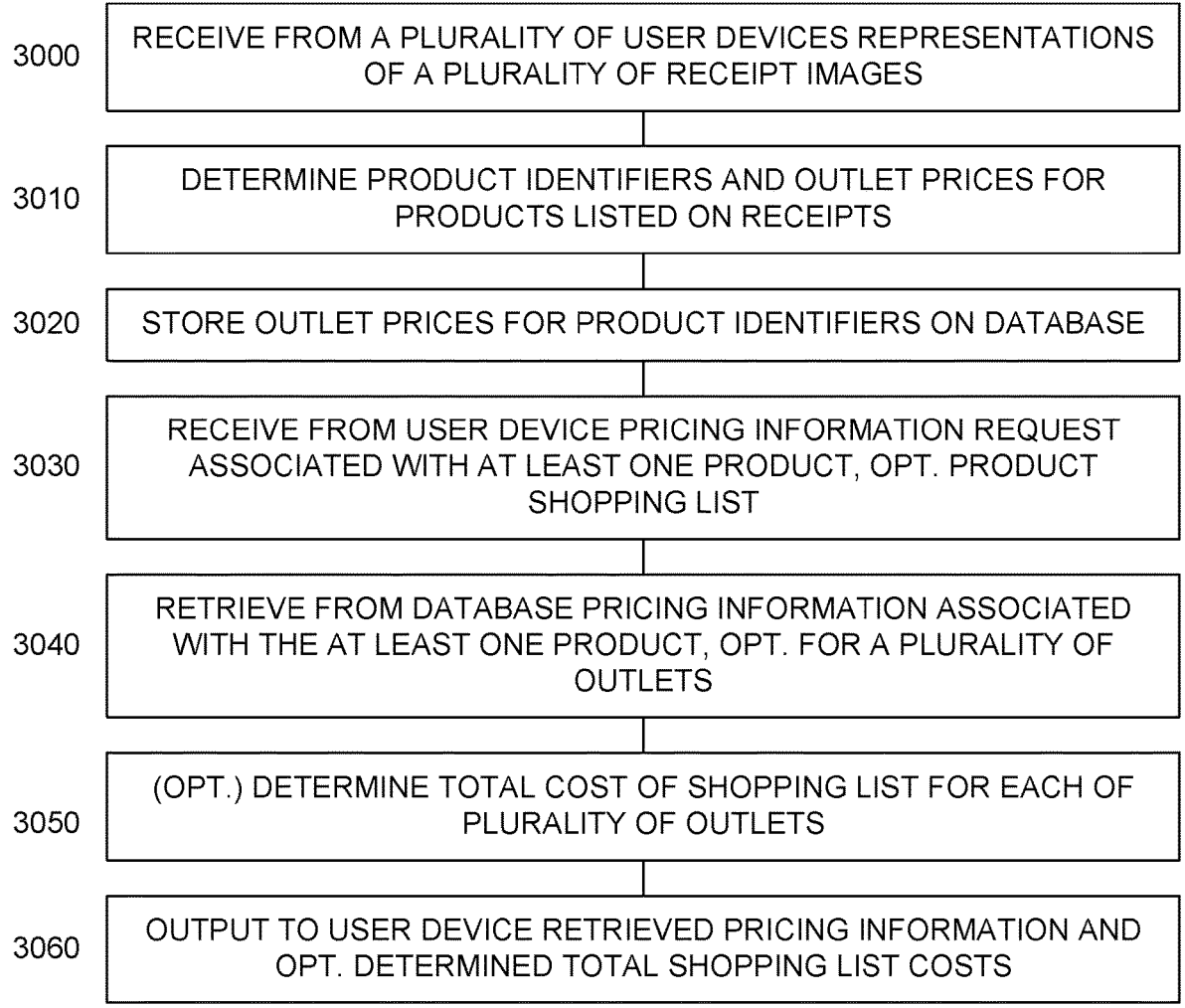
FIG. 4 illustrates a high level flow chart of a method of providing pricing information to a user, in accordance with certain embodiments.

In 6080, receipt information extraction system 10 receives the scanned information from user device 50. In stage 6090, processor 20 stores the received barcode information on product database 200, which preferably includes the UPC of the product. Additionally, processor 20 associates the UPC of the product with the identified first text portion of stage 6010 and preferably the identified outlet of stage 6020. Thus, product database 200 now has stored thereon the product identifier of the specific product for the specific outlet as it is written on the outlet's receipts. As a result, as described above in relation to optional stage 1055, when identifying candidate product identifiers, the known identifiers of specific products can be used. In another embodiment, as described above, the identified first text portion is associated with the product UPC and stored on product database 200 without association to a specific outlet. FIG. 4 illustrates a high level flow chart of a method of providing pricing information to a user, in accordance with certain embodiments. In stage 3000, processor 20 of receipt information extraction system 10 receives from a plurality of user devices 50, via communications modules 40 and 70, representations of a plurality of receipt images, as described above in relation to stages 1000 and 2000. In stage 3010, processor 20 determines product identifiers and respective prices from the received receipt image representations of stage 3000, as described above in relation to stages 1010-1100 and 2010-2100. In stage 3020, processor 20 stores the prices associated with the determined product identifiers, for the respective issuing outlets, on outlet database 210.

In stage 3030, processor 20 receives from one of user devices 50 a pricing information request regarding at least one product, optionally a plurality of products. In one embodiment, the user of user device 50 prepares a shopping list of products to purchase, the shopping list sent to receipt information extraction system 10. In one embodiment, a list of unique product identifiers are stored on memory 80 and processor 70 prepares the unique product identifier of the at least one product. Processor 70 transmits, via communications module 90, to communications module 40 of receipt information extraction system 10 the unique product identifier. In another embodiment, processor 70 transmits attributes of the at least one product, such as the name, brand, size, and/or other attributes, to receipt information extraction system 10.

In stage 3040, processor 20 is arranged to retrieve from outlet database 210 pricing information associated with the product identifier of the at least one product of the received pricing information request of stage 3030. Optionally, processor 20 retrieves pricing information for the at least one product for each of a plurality of outlets. In stage 3050, processor 20 outputs the retrieved pricing information of stage 3040 to user device 50. In optional stage 3060, in the event that a pricing information request is received for a plurality of products, processor 20 determines, for each of the plurality of outlets of stage 3050, the total cost of the plurality of products. Processor 20 transmits the determined total cost for each outlet to user device 50. Thus, responsive to the receipt of a shopping list, processor 20 prepares the total cost of the shopping list for each of a plurality of outlets, thereby providing the user with knowledge of how much the list of products will cost in each outlet.

Figure 5A:
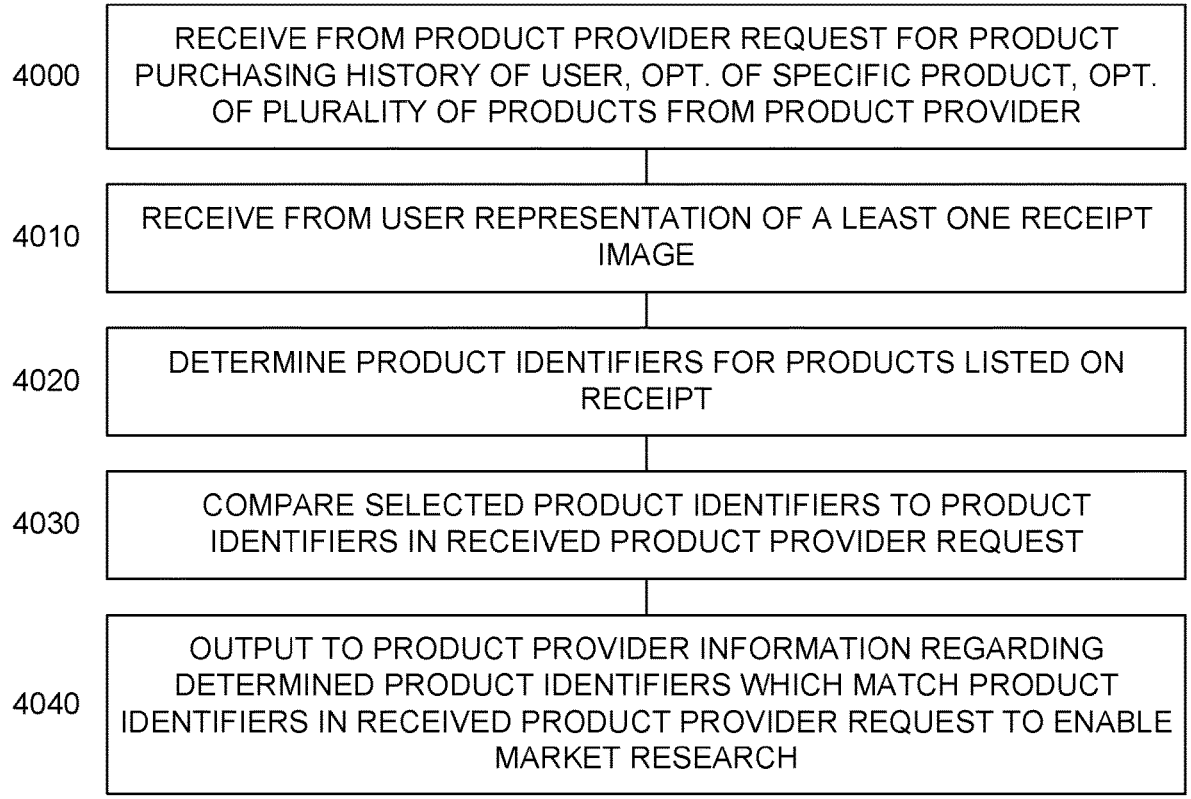
FIG. 5A illustrates a high level flow chart of a method of providing a user purchasing history to a product provider, in accordance with certain embodiments.

FIG. 5A illustrates a high level flow chart of a method of providing a user purchasing history to a product provider, in accordance with certain embodiments. The term 'product provider' as used herein is meant to include a manufacturer, importer or distributor of products. In stage 4000, processor 20 receives from a product provider, via communications module 40, a request for a purchasing history of a user of a product represented by a particular product identifier. For example, processor 20 receives from a juice manufacturing company a request for a purchasing history of apple juice by a user of any of user devices 50. In one embodiment, the request comprises a unique product identifier of the apple juice. In another embodiment, the request comprises a plurality of unique identifiers, each for a different type of apple juice.

In stage 4010, processor 20 receives, via communications module 40, a representation of at least one receipt image from user device 50. In stage 4020, processor 20 determines product identifiers from the received at least one receipt image representation of stage 4010, as described above in relation to stages 1010-1100 and 2010-2100. In stage 4020, processor 20 compares the selected product identifier of stages 1100 and 2100 with the particular product identifier of the received product provider request of stage 4000.

In the event that in stage 4020 the outcome of the comparison indicates that the selected product identifier matches the particular product identifier of the received product provider request, i.e. the user purchased the product provider's product, processor 20 outputs to the product provider information regarding the selected product identifier. In one embodiment, processor 20 transmits the selected product identifier and the quantity purchased by the user. Thus, the product provider receives information regarding their products which are purchased by different users. This provides an efficient tool for market research where the product provider will know which people purchase which products. In one embodiment, processor 20 further obtains user information, such as age, sex, occupation, location, etc. This user information is set to the product provider in order to further increase the effectiveness of the market research.

Figure 5B:
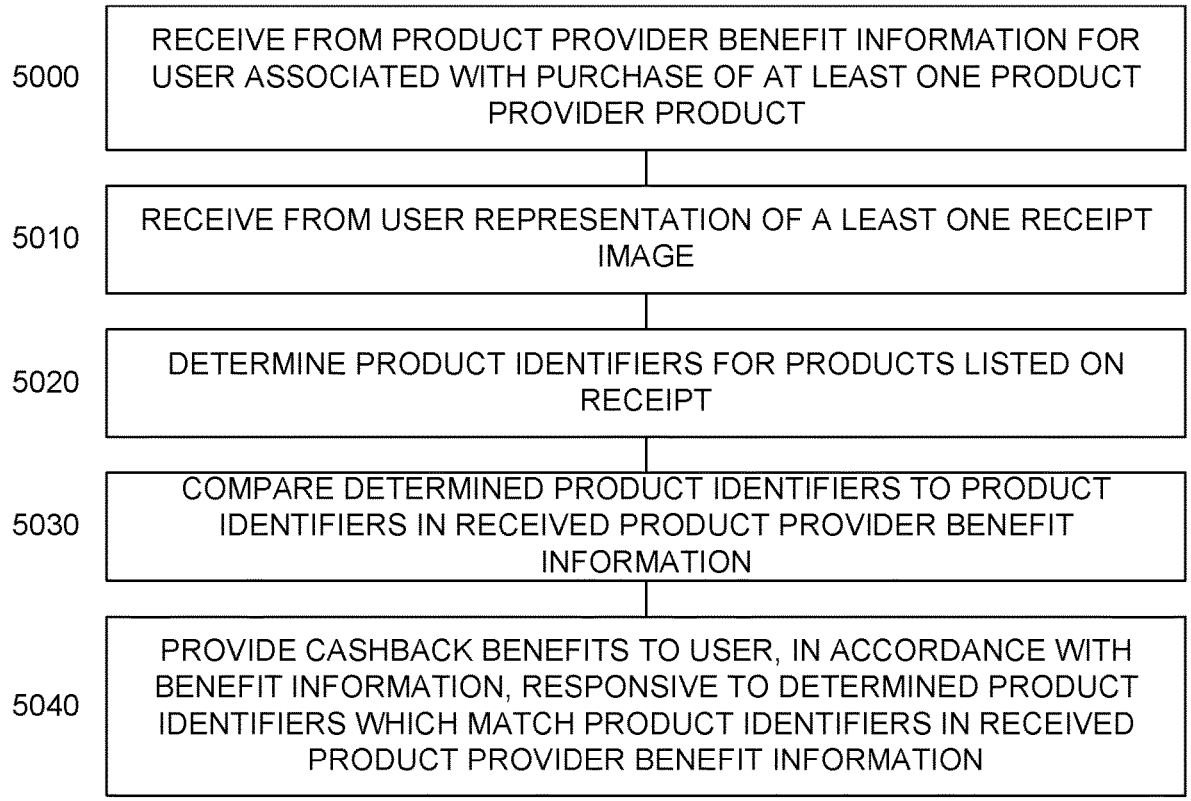
FIG. 5B illustrates a high level flow chart of a method of providing product provider benefits to a user, in accordance with certain embodiments.

FIG. 5B illustrates a high level flow chart of a method of providing product provider benefits to a user, also known as cashback benefits, in accordance with certain embodiments. In stage 5000, processor 20 receives from a product provider, via communications module 40, benefit information for a user of a user device 50. The received benefit information is associated with the purchase of at least one product of the product provider. For example, benefit information received from a juice manufacturing company includes instructions to provide a predetermined monetary benefit to the user if the user purchases a predetermined number of the product provider's products. In one embodiment, the benefit information comprises unique product identifiers of the products associated with the benefits.

In stage 5010, processor 20 receives, via communications module 40, a representation of at least one receipt image from user device 50. In stage 5020, processor 20 determines product identifiers from the received at least one receipt image representation of stage 5010, as described above in relation to stages 1010-1100 and 2010-2100. In stage 5020, processor 20 compares the selected product identifier of stages 1100 and 2100 with the unique product identifier of the received benefit information of stage 5000.

In the event that in stage 5020 the outcome of the comparison indicates that the selected product identifier matches the unique product identifier of the received benefit information, i.e. the user purchased the product provider's product, processor 20 provides benefits to the user in accordance with the received benefit information. For example, if the benefit information includes monetary benefits for purchasing products of that product provider, processor 20 in one embodiment increases the amount of money in an account of the user. In another embodiment, processor 20 provides the user with a discount for future purposes.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A machine implemented method for extracting information from a receipt, the method comprising:
receiving an image of the receipt;
identifying a first text portion within said received receipt image which represents a product name abbreviation;
abbreviating, in accordance with at least one abbreviation rule, at least one of said identified first text portion and a plurality of product names stored on a product database, each of the product names associated with one of a plurality of product identifiers;
determining a plurality of candidates of said plurality of product identifiers responsive to said abbreviation;
for each of a plurality of predetermined features, assigning a value to each of said identified candidate product identifiers;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion; and
outputting said selected candidate product identifier,
wherein each of said identified first text portion and said plurality of product names are abbreviated in accordance with said at least one abbreviation rule, the method further comprising comparing said abbreviated first text portion to each of said abbreviated product names, and
wherein said candidate product identifier determination is responsive to said comparison.

2. A machine implemented method for extracting information from a receipt, the method comprising:
receiving an image of the receipt;
identifying a first text portion within said received receipt image which represents a product name abbreviation;
abbreviating, in accordance with at least one abbreviation rule, at least one of said identified first text portion and a plurality of product names stored on a product database, each of the product names associated with one of a plurality of product identifiers;
determining a plurality of candidates of said plurality of product identifiers responsive to said abbreviation;
for each of a plurality of predetermined features, assigning a value to each of said identified candidate product identifiers;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion; and
outputting said selected candidate product identifier,
wherein said at least one abbreviation rule comprises one of:
a removal of sequentially repeating characters;
a removal of a vowel; and
a porter stemming algorithm.

3. A machine implemented method for extracting information from a receipt, the method comprising:
receiving an image of the receipt;
identifying a first text portion within said received receipt image which represents a product name abbreviation;
abbreviating, in accordance with at least one abbreviation rule, at least one of said identified first text portion and a plurality of product names stored on a product database, each of the product names associated with one of a plurality of product identifiers;
determining a plurality of candidates of said plurality of product identifiers responsive to said abbreviation;
for each of a plurality of predetermined features, assigning a value to each of said identified candidate product identifiers;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion; and outputting said selected candidate product identifier, wherein the method further comprises tokenizing said identified first text portion into a plurality of tokens, and wherein said at least one abbreviation rule comprises a plurality of abbreviation rules, a first of said plurality of tokens is abbreviated in accordance with a first of said plurality of abbreviation rules and a second of said plurality of tokens is abbreviated in accordance with a second of said plurality of abbreviation rules.

4. A machine implemented method for extracting information from a receipt, the method comprising:

receiving an image of the receipt;

identifying a first text portion within said received receipt image which represents a product name abbreviation;

abbreviating, in accordance with at least one abbreviation rule, at least one of said identified first text portion and a plurality of product names stored on a product database, each of the product names associated with one of a plurality of product identifiers;

determining a plurality of candidates of said plurality of product identifiers responsive to said abbreviation;

for each of a plurality of predetermined features, assigning a value to each of said identified candidate product identifiers;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion;

outputting said selected candidate product identifier;

identifying a second text portion within said received receipt image containing information regarding the outlet which issued the receipt;

responsive to said identified second text portion, determining the identity of the outlet which issued the receipt; and responsive to said determined outlet identity and a predetermined relation rule, identifying at least one additional outlet related to the outlet which issued the receipt, wherein said assigned value for a respective one of said predetermined features is responsive to a purchasing history of a product represented by said respective candidate product identifier in said identified related additional outlet.

5. The method of claim 4, wherein said identifying said at least one additional related outlet comprises identifying a plurality of related outlets within a predetermined distance from the outlet which issued the receipt.

6. The method of claim 5, wherein said assigned value for a respective one of said features is responsive to whether a product represented by said respective candidate product identifier was sold in any of said identified plurality of related outlets during a predetermined time period.

7. The method of claim 4, further comprising:

identifying a third text portion within said received receipt image which represents the price of the product represented by said identified first text portion; and responsive to said identified third text portion, determining the price of the product represented by said identified first text portion, wherein said assigned value for a respective one said predetermined features is responsive to the number of times a product represented by said respective candidate product identifier was sold in said identified at least one additional related outlet within a predetermined margin of said determined price.

8. The method of claim 4, further comprising:

identifying a third text portion within said received receipt image which represents the price of the product represented by said identified first text portion; and responsive to said identified third text portion, determining the price of the product represented by said identified first text portion, wherein said identifying at least one additional related outlet comprises identifying a plurality of additional related outlets, wherein said assigned value for a respective one said predetermined features is responsive to the distance between the outlet which issued the receipt and the closest of said identified additional related outlets which sold a product represented by said respective candidate product identifier within a predetermined margin of said determined price.

9. A machine implemented method for extracting information from a receipt, the method comprising:

receiving an image of the receipt;

identifying a first text portion within said received receipt image which represents a product name abbreviation;

abbreviating, in accordance with at least one abbreviation rule, at least one of said identified first text portion and a plurality of product names stored on a product database, each of the product names associated with one of a plurality of product identifiers;

determining a plurality of candidates of said plurality of product identifiers responsive to said abbreviation;

for each of a plurality of predetermined features, assigning a value to each of said identified candidate product identifiers;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion;

outputting said selected candidate product identifier;

identifying a second text portion within said received receipt image containing information regarding the outlet which issued the receipt;

responsive to said identified second text portion, determining the identity of the outlet which issued the receipt;

identifying a third text portion within said received receipt image which represents the price of the product represented by said identified first text portion;

responsive to said identified third text portion, determining the price of the product represented by said identified first text portion;

associating said determined candidate product identifier with said determined product price and said determined outlet identity; and outputting said associated product price and outlet identity.

10. The method of claim 9, further comprising:
comparing said determined product price to historical price of products represented by said selected candidate product in the outlet which issued the receipt; and
responsive to an output of said comparison that said determined product price is lower than the historical price, outputting an indication that a product represented by said selected candidate product identifier is on sale at the outlet which issued the receipt.

11. A machine implemented method for extracting information from a receipt, the method comprising:
receiving an image of the receipt;
identifying a first text portion within said received receipt image which represents a product name abbreviation;
abbreviating, in accordance with at least one abbreviation rule, at least one of said identified first text portion and a plurality of product names stored on a product database, each of the product names associated with one of a plurality of product identifiers;
determining a plurality of candidates of said plurality of product identifiers responsive to said abbreviation;
for each of a plurality of predetermined features, assigning a value to each of said identified candidate product identifiers;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion;
outputting said selected candidate product identifier;
receiving from a product provider a request for a purchasing history of a user of a product represented by a particular product identifier;
comparing said selected product identifier with the particular product identifier of said received request; and
responsive to an outcome of said comparison indicating that said selected product identifier matches the particular product identifier of said received request, outputting to the product provider information regarding said selected product identifier.

12. A machine implemented method for extracting information from a receipt, the method comprising:
receiving an image of the receipt;
identifying a first text portion within said received receipt image which represents a product name abbreviation;
abbreviating, in accordance with at least one abbreviation rule, at least one of said identified first text portion and a plurality of product names stored on a product database, each of the product names associated with one of a plurality of product identifiers;
determining a plurality of candidates of said plurality of product identifiers responsive to said abbreviation;
for each of a plurality of predetermined features, assigning a value to each of said identified candidate product identifiers;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion;
outputting said selected candidate product identifier;
receiving from a product provider benefit information for a user associated with the purchase of a product represented by a particular product identifier;
comparing said selected product identifier with the particular product identifier of said received benefit information; and
responsive to an outcome of said comparison indicating that said selected product identifier matches the particular product identifier of said received benefit information, providing benefits to user in accordance with said received benefit information.

13. A machine implemented method for extracting information from a receipt, the method comprising:
receiving an image of the receipt;
identifying a first text portion within said received receipt image which represents a product name abbreviation;
abbreviating, in accordance with at least one abbreviation rule, at least one of said identified first text portion and a plurality of product names stored on a product database, each of the product names associated with one of a plurality of product identifiers;
determining a plurality of candidates of said plurality of product identifiers responsive to said abbreviation;
for each of a plurality of predetermined features, assigning a value to each of said identified candidate product identifiers;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion; and
outputting said selected candidate product identifier,
wherein the method further comprises comparing said identified first text portion to a plurality of known product identifiers, and
wherein said candidate product identifier determination is further responsive to the outcome of said comparison with known product identifiers.

14. The method of claim 13, wherein responsive to an unsuccessful selection in accordance with said predetermined scoring rule, the method further comprises:
transmitting to a user device a signal which prompts a user of the user device to scan a barcode of the unidentified product;
receiving barcode information of the unidentified product from the user device;
storing said received barcode information; and
associating said received barcode information with said identified first text portion.

15. A machine implemented method for extracting information from a receipt, the method comprising:
receiving an image of the receipt;
identifying a first text portion within said received receipt image which represents a product name;
identifying a second text portion within said received receipt image containing information regarding the outlet which issued the receipt;
responsive to said identified second text portion, determining the identity of the outlet which issued the receipt;
responsive to said determined outlet identity and a predetermined relation rule, identifying at least one additional outlet related to the outlet which issued the receipt;

responsive to a predetermined similarity rule, determining a plurality of candidate product identifiers stored on a database which have associated product names that exhibit a predetermined similarity with said identified first text portion;

for each of a plurality of predetermined features, assigning a value to each of said identified candidate product identifiers, said assigned value for a respective one of said predetermined features is responsive to a purchasing history of a product represented by said respective candidate product identifier in said identified related additional outlet;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion; and outputting said selected candidate product identifier, wherein said identifying said at least one additional related outlet comprises identifying a plurality of related outlets within a predetermined distance from the outlet which issued the receipt.

16. The method of claim 15, wherein said assigned value for a respective one of said predetermined features is responsive to whether a product represented by said respective candidate product identifier was sold in any of said identified plurality of related outlets during a predetermined time period.

17. A machine implemented method for extracting information from a receipt, the method comprising:

receiving an image of the receipt;

identifying a first text portion within said received receipt image which represents a product name;

identifying a second text portion within said received receipt image containing information regarding the outlet which issued the receipt;

responsive to said identified second text portion, determining the identity of the outlet which issued the receipt;

responsive to said determined outlet identity and a predetermined relation rule, identifying at least one additional outlet related to the outlet which issued the receipt;

responsive to a predetermined similarity rule, determining a plurality of candidate product identifiers stored on a database which have associated product names that exhibit a predetermined similarity with said identified first text portion;

for each of a plurality of predetermined features, assigning a value to each of said identified candidate product identifiers, said assigned value for a respective one of said predetermined features is responsive to a purchasing history of a product represented by said respective candidate product identifier in said identified related additional outlet;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion;

outputting said selected candidate product identifier;

identifying a third text portion within said received receipt image which represents the price of the product represented by said identified first text portion; and responsive to said identified third text portion, determining the price of the product represented by said identified first text portion, wherein said assigned value for a respective one said predetermined features is responsive to the number of times a product represented by said respective candidate product identifier was sold in said identified at least one additional related outlet within a predetermined margin of said determined price.

18. A machine implemented method for extracting information from a receipt, the method comprising:

receiving an image of the receipt;

identifying a first text portion within said received receipt image which represents a product name;

identifying a second text portion within said received receipt image containing information regarding the outlet which issued the receipt;

responsive to said identified second text portion, determining the identity of the outlet which issued the receipt;

responsive to said determined outlet identity and a predetermined relation rule, identifying at least one additional outlet related to the outlet which issued the receipt;

responsive to a predetermined similarity rule, determining a plurality of candidate product identifiers stored on a database which have associated product names that exhibit a predetermined similarity with said identified first text portion;

for each of a plurality of predetermined features, assigning a value to each of said identified candidate product identifiers, said assigned value for a respective one of said predetermined features is responsive to a purchasing history of a product represented by said respective candidate product identifier in said identified related additional outlet;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion;

outputting said selected candidate product identifier;

identifying a third text portion within said received receipt image which represents the price of the product represented by said identified first text portion; and responsive to said identified third text portion, determining the price of the product represented by said identified first text portion, wherein said identifying at least one additional related outlet comprises identifying a plurality of additional related outlets, and wherein said assigned value for a respective one said predetermined features is responsive to the distance between the outlet which issued the receipt and the closest of said identified additional related outlets which sold a product represented by said respective candidate product identifier within a predetermined margin of said determined price.

19. A machine implemented method for extracting information from a receipt, the method comprising:
receiving an image of the receipt;
identifying a first text portion within said received receipt image which represents a product name;
identifying a second text portion within said received receipt image containing information regarding the outlet which issued the receipt;
responsive to said identified second text portion, determining the identity of the outlet which issued the receipt;
responsive to said determined outlet identity and a predetermined relation rule, identifying at least one additional outlet related to the outlet which issued the receipt;
responsive to a predetermined similarity rule, determining a plurality of candidate product identifiers stored on a database which have associated product names that exhibit a predetermined similarity with said identified first text portion;
for each of a plurality of predetermined features, assigning a value to each of said identified candidate product identifiers, said assigned value for a respective one of said predetermined features is responsive to a purchasing history of a product represented by said respective candidate product identifier in said identified related additional outlet;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion; and
outputting said selected candidate product identifier,
wherein the method further comprises abbreviating, in accordance with at least one abbreviation rule, at least one of said identified first text portion and the plurality of product names, and
wherein said candidate product identifier determination is responsive to said abbreviation.

20. The method of claim 19, wherein each of said identified first text portion and said plurality of product names are abbreviated in accordance with said at least one abbreviation rule, the method further comprising comparing said abbreviated first text portion to each of said abbreviated product names,
wherein said candidate product identifier determination is responsive to said comparison.

21. The method of claim 19, wherein said at least one abbreviation rule comprises one of:
a removal of sequentially repeating characters;
a removal of a vowel; and
a porter stemming algorithm.

22. The method of claim 19, further comprising tokenizing said identified first text portion into a plurality of tokens,
wherein said at least one abbreviation rule comprises a plurality of abbreviation rules, a first of said plurality of tokens is abbreviated in accordance with a first of said plurality of abbreviation rules and a second of said plurality of tokens is abbreviate in accordance with a second of said plurality of abbreviation rules.

23. A machine implemented method for extracting information from a receipt, the method comprising:
receiving an image of the receipt;
identifying a first text portion within said received receipt image which represents a product name;
identifying a second text portion within said received receipt image containing information regarding the outlet which issued the receipt;
responsive to said identified second text portion, determining the identity of the outlet which issued the receipt;
responsive to said determined outlet identity and a predetermined relation rule, identifying at least one additional outlet related to the outlet which issued the receipt;
responsive to a predetermined similarity rule, determining a plurality of candidate product identifiers stored on a database which have associated product names that exhibit a predetermined similarity with said identified first text portion;
for each of a plurality of predetermined features, assigning a value to each of said identified candidate product identifiers, said assigned value for a respective one of said predetermined features is responsive to a purchasing history of a product represented by said respective candidate product identifier in said identified related additional outlet;
responsive to said assigned values, assigning a candidate score to each of said identified candidate product identifiers;
responsive to said assigned candidate scores and a predetermined scoring rule, selecting one of said determined candidate product identifiers, said selected candidate product identifier being represented by said identified first text portion;
outputting said selected candidate product identifier;
identifying a third text portion within said received receipt image which represents the price of the product represented by said identified first text portion;
responsive to said identified third text portion, determining the price of the product represented by said identified first text portion; and
associating said selected candidate product with said determined product price and said determined outlet identity,
wherein said outputting said determined candidate product further comprises outputting said associated product price and outlet identity.

24. The method of claim 23, further comprising:
comparing said determined product price to historical price of products represented by said selected candidate product in the outlet which issued the receipt; and
responsive to an output of said comparison that said determined product price is lower than the historical price, outputting an indication that a product represented by said selected candidate product identifier is on sale at the outlet which issued the receipt.

25. A machine implemented method for extracting information from a receipt, the method comprising:
receiving an image of the receipt;
identifying a first text portion within said received receipt image which represents a product name;
identifying a second text portion within said received receipt image containing information regarding the outlet which issued the receipt;
responsive to said identified second text portion, determining the identity of the outlet which issued the receipt;

responsive to said determined outlet identity and a predetermined relation rule, identifying at least one additional outlet related to the outlet which issued the receipt;

responsive to a predetermined similarity rule, determining a plurality of candidate product identifiers stored on a database which have associated product names that exhibit a predetermined similarity with said identified first text portion;

for each of a plurality of predetermined features, assigning a value to each of said identified candidate product identifiers, said assigned value for a respective one of said predetermined features is responsive to a purchasing history of a product represented by said respective candidate product identifier in said identified related additional outlet;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion;

outputting said selected candidate product identifier;

receiving from a product provider a request for a purchasing history of a user of a product represented by a particular product identifier;

comparing said selected product identifier with the particular product identifier of said received request; and responsive to an outcome of said comparison indicating that said selected product identifier matches the particular product identifier of said received request, outputting to the product provider information regarding said selected product identifier.

26. A machine implemented method for extracting information from a receipt, the method comprising:

receiving an image of the receipt;

identifying a first text portion within said received receipt image which represents a product name;

identifying a second text portion within said received receipt image containing information regarding the outlet which issued the receipt;

responsive to said identified second text portion, determining the identity of the outlet which issued the receipt;

responsive to said determined outlet identity and a predetermined relation rule, identifying at least one additional outlet related to the outlet which issued the receipt;

responsive to a predetermined similarity rule, determining a plurality of candidate product identifiers stored on a database which have associated product names that exhibit a predetermined similarity with said identified first text portion;

for each of a plurality of predetermined features, assigning a value to each of said identified candidate product identifiers, said assigned value for a respective one of said predetermined features is responsive to a purchasing history of a product represented by said respective candidate product identifier in said identified related additional outlet;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion;

outputting said selected candidate product identifier;

receiving from a product provider benefit information for a user associated with the purchase of a product represented by a particular product identifier;

comparing said selected product identifier with the particular product identifier of said received benefit information; and responsive to an outcome of said comparison indicating that said selected product identifier matches the particular product identifier of said received benefit information, providing benefits to user in accordance with said received benefit information.

27. A machine implemented method for extracting information from a receipt, the method comprising:

receiving an image of the receipt;

identifying a first text portion within said received receipt image which represents a product name;

identifying a second text portion within said received receipt image containing information regarding the outlet which issued the receipt;

responsive to said identified second text portion, determining the identity of the outlet which issued the receipt;

responsive to said determined outlet identity and a predetermined relation rule, identifying at least one additional outlet related to the outlet which issued the receipt;

responsive to a predetermined similarity rule, determining a plurality of candidate product identifiers stored on a database which have associated product names that exhibit a predetermined similarity with said identified first text portion;

for each of a plurality of predetermined features, assigning a value to each of said identified candidate product identifiers, said assigned value for a respective one of said predetermined features is responsive to a purchasing history of a product represented by said respective candidate product identifier in said identified related additional outlet;

responsive to said assigned values, assigning a candidate score to each of said identified candidate product identifiers;

responsive to said assigned candidate scores and a predetermined scoring rule, selecting one of said determined candidate product identifiers, said selected candidate product identifier being represented by said identified first text portion; and outputting said selected candidate product identifier, wherein the method further comprises comparing said identified first text portion to a plurality of known product identifiers, and wherein said candidate product identifier determination is further responsive to the outcome of said comparison with known product identifiers.

28. The method of claim 27, wherein responsive to an unsuccessful selection in accordance with said predetermined scoring rule, the method further comprises:

transmitting to a user device a signal which prompts a user of the user device to scan a barcode of the unidentified product;

receiving barcode information of the unidentified product from the user device;

storing said received barcode information; and associating said received barcode information with said identified first text portion.

* * * * *